(12) United States Patent
    Mizuta

(10) Patent No.:     US 10,720,051 B2
(45) Date of Patent:      Jul. 21, 2020

(54) ABNORMAL TRAVEL DETECTING DEVICE, ABNORMAL TRAVEL DETECTING METHOD, STORAGE MEDIUM STORING PROGRAM FOR SAME, AND ABNORMAL TRAVEL DETECTING SYSTEM

(71) Applicant: NEC Corporation, Minato-ku, Tokyo (JP)

(72) Inventor: Shinya Mizuta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 3 days.

(21) Appl. No.: 16/083,548

(22) PCT Filed: Mar. 8, 2017

(86) PCT No.: PCT/JP2017/009193
§ 371 (c)(1),
(2) Date: Sep. 10, 2018

(87) PCT Pub. No.: WO2017/154967
PCT Pub. Date: Sep. 14, 2017

(65) Prior Publication Data
US 2019/0080593 A1    Mar. 14, 2019

(30) Foreign Application Priority Data
Mar. 11, 2016  (JP) ................. 2016-048656

(51) Int. Cl.
    G08G 1/01     (2006.01)
    G08G 1/09     (2006.01)
    B60W 40/107   (2012.01)
(52) U.S. Cl.
    CPC ......... *G08G 1/0141* (2013.01); *B60W 40/107* (2013.01); *G08G 1/0112* (2013.01);
    (Continued)

(58) Field of Classification Search
    CPC ...... G08G 1/09; G08G 1/0112; G08G 1/0116; G08G 1/0133; G08G 1/0141; B60W 40/10
    (Continued)

(56) References Cited

U.S. PATENT DOCUMENTS 9,189,897 B1 * 11/2015 Stenneth ............... B60W 40/06
10,479,373 B2 * 11/2019 Mudalige .......... B60W 50/0097
(Continued)

FOREIGN PATENT DOCUMENTS

JP    2002-260163 A    9/2002
JP    2003-256997 A    9/2003
(Continued)

OTHER PUBLICATIONS

International Search Report for PCT Application No. PCT/JP2017/009193, dated Apr. 25, 2017.
(Continued)

*Primary Examiner* — Atul Trivedi

(57) ABSTRACT

An abnormal travel detecting device includes a traffic data acquiring receiver configured to acquire traffic data indicating a traffic state of a road measured by a traffic state measuring device that is installed on the road and measures the traffic state of the road. The abnormal travel detecting device includes a measured value receiver configured to acquire a measured value indicating a behavior of a vehicle measured by a behavior measuring device that is mounted on the vehicle and measures the behavior of the vehicle, and a detector configured to detect, based on the traffic data and the measured values, abnormal travel of a vehicle.

15 Claims, 22 Drawing Sheets

(52) U.S. Cl.
CPC ......... *G08G 1/0116* (2013.01); *G08G 1/0133* (2013.01); *G08G 1/09* (2013.01)

(58) Field of Classification Search
USPC .......................................................... 701/117
See application file for complete search history.

(56) References Cited

U.S. PATENT DOCUMENTS

| | | | | |
|---|---|---|---|---|
| 2007/0027583 | A1* | 2/2007 | Tamir | G06Q 30/0283 |
| | | | | 701/1 |
| 2011/0137508 | A1* | 6/2011 | Garcia Manchado | ........................ |
| | | | | G07C 5/0825 |
| | | | | 701/31.4 |
| 2015/0046078 | A1 | 2/2015 | Biess et al. | |
| 2015/0091716 | A1* | 4/2015 | Hathaway | B60Q 1/525 |
| | | | | 340/435 |
| 2015/0211870 | A1* | 7/2015 | Nickolaou | G01C 21/34 |
| | | | | 701/28 |
| 2015/0248795 | A1* | 9/2015 | Davidson | G01C 21/34 |
| | | | | 701/1 |
| 2015/0332114 | A1* | 11/2015 | Springer | G06K 9/4604 |
| | | | | 348/148 |
| 2016/0061625 | A1* | 3/2016 | Wang | G06Q 30/0214 |
| | | | | 701/454 |
| 2016/0093210 | A1* | 3/2016 | Bonhomme | G08G 1/0967 |
| | | | | 340/905 |
| 2016/0171521 | A1* | 6/2016 | Ramirez | G06Q 30/0224 |
| | | | | 701/409 |
| 2016/0304028 | A1* | 10/2016 | Hathaway | G01S 7/10 |
| 2016/0318490 | A1* | 11/2016 | Ben Shalom | B60W 30/18109 |
| 2016/0342850 | A1* | 11/2016 | Elimalech | G08G 1/161 |
| 2016/0368492 | A1* | 12/2016 | Al-Stouhi | G08G 1/162 |
| 2017/0200061 | A1* | 7/2017 | Julian | G06K 9/00791 |
| 2018/0268695 | A1* | 9/2018 | Agnew | B60W 40/04 |
| 2018/0299284 | A1* | 10/2018 | Wang | G08G 1/0141 |
| 2018/0359445 | A1* | 12/2018 | Liao | H04N 5/77 |
| 2019/0016345 | A1* | 1/2019 | Kitagawa | B60W 50/14 |
| 2019/0156134 | A1* | 5/2019 | Krishnan | B60W 30/00 |
| 2019/0206254 | A1* | 7/2019 | Tao | G08G 1/164 |
| 2019/0291727 | A1* | 9/2019 | Shalev-Shwartz | B60W 10/18 |
| 2019/0333371 | A1* | 10/2019 | Julian | G06K 9/6271 |
| 2019/0355245 | A1* | 11/2019 | Gigengack | G08G 1/0129 |
| 2020/0082191 | A1* | 3/2020 | Krishnan | B60W 40/09 |

FOREIGN PATENT DOCUMENTS

| | | |
|---|---|---|
| JP | 2004-286531 A | 10/2004 |
| JP | 4845783 B2 | 12/2011 |
| JP | 2012-053564 A | 3/2012 |
| JP | 2013-008148 A | 1/2013 |

OTHER PUBLICATIONS

English translation of Written opinion for PCT Application No. PCT/JP2017/009193.
Japanese Office Action for JP Application No. 2018-504550 dated Jan. 7, 2020 with English Translation.
Japanese Office Action for JP Application No. 2018-504550 dated Mar. 10, 2020 with English Translation.

* cited by examiner

Fig. 12

| | 1 | 2 | 3 | 4 | 5 | 6 | 7 |
|---|---|---|---|---|---|---|---|
| | 40 | 40 | 20 | 10 | 10 | 30 | 40 |
| | 20 | 20 | 40 | 50 | 50 | 30 | 20 |
| | 20 | 20 | 10 | 10 | 20 | 20 | 20 |
| | 30 | 30 | 40 | 40 | 40 | 30 | 30 |

Fig. 13

| | 1 | 2 | 3 | 4 | 5 | 6 | 7 |
|---|---|---|---|---|---|---|---|
| | 100 | 90 | 60 | 30 | 20 | 60 | 80 |
| | 120 | 100 | 80 | 40 | 50 | 70 | 100 |
| | 120 | 110 | 110 | 120 | 130 | 120 | 120 |
| | 100 | 100 | 90 | 90 | 100 | 100 | 100 |

| | 1 | 2 | 3 | 4 | 5 | 6 | 7 |
|---|---|---|---|---|---|---|---|
| | 0 | 3 | 10 | 10 | 20 | 15 | 5 |
| | 0 | 1 | 3 | 15 | 8 | 5 | 3 |
| | 2 | 1 | 3 | 2 | 0 | 1 | 0 |
| | 1 | 3 | 3 | 0 | 1 | 0 | 0 |

| | 1 | 2 | 3 | 4 | 5 | 6 | 7 |
|---|---|---|---|---|---|---|---|
| | -20 | 0 | 10 | 60 | 50 | 10 | -10 |
| | 0 | 0 | 20 | 40 | 30 | 10 | 10 |
| ⋮ | ⋮ | ⋮ | ⋮ | ⋮ | ⋮ | ⋮ | ⋮ |
| | 0 | 0 | 10 | 20 | 0 | 0 | 0 |
| | 0 | 0 | 0 | -20 | -20 | 0 | 0 |

⇒

| | 1 | 2 | 3 | 4 | 5 | 6 | 7 |
|---|---|---|---|---|---|---|---|
| | 1 | 0 | 1 | 1 | 1 | 1 | 1 |
| | 0 | 0 | 1 | 1 | 1 | 1 | 1 |
| ⋮ | ⋮ | ⋮ | ⋮ | ⋮ | ⋮ | ⋮ | ⋮ |
| | 0 | 0 | 1 | 1 | 0 | 0 | 0 |
| | 0 | 0 | 0 | 1 | 1 | 0 | 0 |

0: NORMAL
1: ABNORMAL

Fig 17

CURRENT VELOCITY MAP

| | 1 | 2 | 3 | 4 | 5 | 6 | 7 |
|---|---|---|---|---|---|---|---|
| | 100 | 90 | 60 | 30 | 20 | 60 | 80 |
| | 120 | 100 | 80 | 40 | 50 | 70 | 100 |
| | ... | ... | ... | ... | ... | ... | ... |
| | 120 | 110 | 110 | 120 | 130 | 120 | 120 |
| | 100 | 100 | 90 | 90 | 100 | 100 | 100 |

VELOCITY MAP OF ONE MINUTE EARLIER

| | 1 | 2 | 3 | 4 | 5 | 6 | 7 |
|---|---|---|---|---|---|---|---|
| | 100 | 90 | 80 | 80 | 90 | 90 | 90 |
| | 120 | 100 | 100 | 110 | 100 | 120 | 100 |
| | ... | ... | ... | ... | ... | ... | ... |
| | 120 | 110 | 110 | 120 | 130 | 120 | 120 |
| | 100 | 100 | 90 | 90 | 100 | 100 | 100 |

VELOCITY DIFFERENCE MAP

| | 1 | 2 | 3 | 4 | 5 | 6 | 7 |
|---|---|---|---|---|---|---|---|
| | 0 | 0 | -20 | -50 | -70 | -30 | -10 |
| | 0 | 0 | -20 | -70 | -50 | -50 | 0 |
| | 0 | 0 | 0 | 0 | 0 | 0 | 0 |
| | 0 | 0 | 0 | 0 | 0 | 0 | 0 | ized by the harsh braking or abrupt steering. Road administrators constantly monitor roads by using a patrol vehicle or a monitoring camera. Road administrators notify general-purpose vehicles of impediment information by incidental facilities on roads such as an information board when an impediment is found.

ABNORMAL TRAVEL DETECTING DEVICE, ABNORMAL TRAVEL DETECTING METHOD, STORAGE MEDIUM STORING PROGRAM FOR SAME, AND ABNORMAL TRAVEL DETECTING SYSTEM

This application is a National Stage Entry of PCT/JP2017/009193 filed on Mar. 8, 2017, which claims priority from Japanese Patent Application 2016-048656 filed on Mar. 11, 2016, the contents of all of which are incorporated herein by reference, in their entirety.

TECHNICAL FIELD

The disclosed subject matter relates to an abnormal drive detecting device configured to detect abnormal drive of a vehicle and the like.

BACKGROUND ART

In order to avoid an obstacle (a fallen object, an accident or the like) found while running on an expressway or a surface street, a vehicle may show a behavior such as harsh braking or abrupt steering. Therefore, a traffic jam or a traffic accident may occur due to a disturbed traffic flow caused by the harsh braking or abrupt steering. Road administrators constantly monitor roads by using a patrol vehicle or a monitoring camera. Road administrators notify general-purpose vehicles of impediment information by incidental facilities on roads such as an information board when an impediment is found.

PTL 1 also discloses a method and a device, which may determine, by a vehicle behavior measuring sensor mounted on a general-purpose vehicle, whether a behavior of the vehicle is abnormal travel. If the vehicle behavior is determined to be abnormal, the method and the device may transmit the behavior of the vehicle that has been determined as abnormal to a server, determine presence or absence of an obstacle and make notifications.

CITATION LIST

Patent Literature

[PTL 1] Japanese Patent No. 4845783

SUMMARY OF INVENTION

Technical Problem

Patrol vehicles may not detect an occurrence of an impediment outside a patrol area or outside a patrol time. Monitoring cameras may not detect an impediment that occurred outside a monitored section. Enlightenment activities have been implemented, such as encouraging general-purpose vehicles to report an impediment to road administrators when they find one; however, there exists a problem where it is difficult for drivers to report immediately after they find one because they are engaging in driving.

In addition, the method and the device disclosed in PTL 1 detect abnormal travel by using only a vehicle behavior measuring sensor mounted on a general-purpose vehicle. However, the method and the device disclosed in PTL 1 may not distinguish between a behavior such as abrupt steering or harsh braking, which occurs due to road design, for example, on roads with many sharp curves or roads where lanes are reduced, and abnormal travel caused by an obstacle.

Thus, it is an object of the disclosed subject matter to provide an abnormal travel detecting device capable of accurately detecting abnormal travel of a vehicle.

Solution to Problem

One aspect of an abnormal travel detecting device according to the disclosed subject matter includes traffic data acquiring means configured to acquire traffic data indicating a traffic state of a road measured by a traffic state measuring device that is installed on the road and measures the traffic state of the road. The abnormal travel detecting device includes measured value acquiring means configured to acquire a measured value indicating a behavior of a vehicle measured by a behavior measuring device that is mounted on the vehicle and measures the behavior of the vehicle, and detecting means configured to detect, based on the traffic data and the measured values, abnormal travel of a vehicle.

One aspect of an abnormal travel detecting system according to the disclosed subject matter includes a traffic state measuring device that is installed on a road and measures a traffic state of the road, and traffic data acquiring means configured to acquire traffic data indicating the traffic state of the road measured by the traffic state measuring device. The abnormal travel detecting system includes a behavior measuring device that is mounted on a vehicle and measures a behavior of the vehicle, measured value acquiring means configured to acquire measured values indicating the behavior of the vehicle measured by the behavior measuring device, and detecting means configured to detect, based on the traffic data and the measured values, abnormal travel of a vehicle.

One aspect of an abnormal travel detecting method according to the disclosed subject matter includes acquiring traffic data indicating a traffic state of a road from a traffic state measuring device that is installed on the road and measures the traffic state of the road. The abnormal travel detecting method includes acquiring measured values indicating a behavior of a vehicle measured by a behavior measuring device that is mounted on the vehicle and measures the behavior of the vehicle, and detecting, based on the traffic data and the measured values, abnormal travel of the vehicle.

A storage medium stores one aspect of an abnormal travel detection program according to the disclosed subject matter. The program causes a computer to execute traffic data acquisition process of acquiring traffic data indicating a traffic state of a road measured by a traffic state measuring device that is installed on the road and measures the traffic state of the road. The program causes the computer to execute measured value acquisition process of acquiring measured values indicating a behavior of the vehicle measured by a behavior measuring device that is mounted on the vehicle and measures the behavior of the vehicle; and detection process of detecting, based on the traffic data and the measured values, abnormal travel of the vehicle.

Advantageous Effects of Invention

According to the disclosed subject matter, abnormal driving of a vehicle may be accurately detected.

BRIEF DESCRIPTION OF DRAWINGS

FIG. 12 is an explanatory diagram illustrating an example of traffic volume maps for seven sections having two lanes each way.

FIG. 13 is an explanatory diagram illustrating an example of velocity maps for seven sections having two lanes each way.

FIG. 14 is an explanatory diagram illustrating an example of acceleration maps for seven sections having two lanes each way.

FIG. 16 is an explanatory diagram illustrating an example of traffic volume difference maps after abnormality flags are attached.

FIG. 17 is an explanatory diagram illustrating an example of velocity difference maps.

EXAMPLE EMBODIMENT

Figure 1:
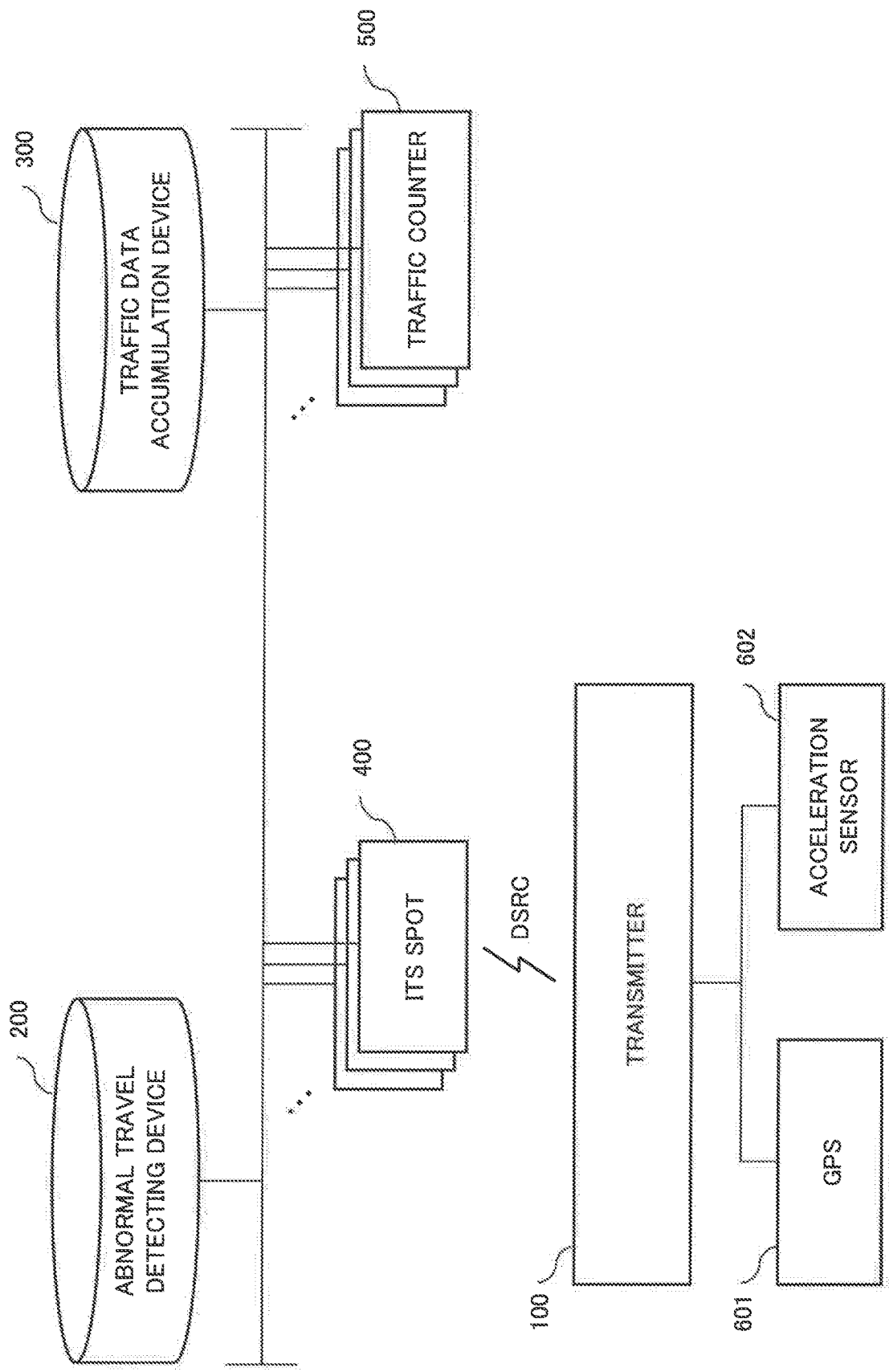
FIG. 1 is a block diagram illustrating a configuration of an abnormal travel detecting system.

Hereinafter, an example embodiment of the disclosed subject matter will be described with reference to the drawings. FIG. 1 is a block diagram illustrating a configuration of an abnormal travel detecting system.

In the present example embodiment, it is assumed that a road administrator has installed a traffic counter 500, which is an example of a traffic state measuring device, and a traffic data accumulation device 300 configured to accumulate traffic data acquired from the traffic counter 500. The abnormal travel detecting system of the present example embodiment includes an abnormal travel detecting device 200, the traffic data accumulation device 300, an Intelligent Transport Systems (ITS) spot 400, and the traffic counter 500, each of which are coupled to a communication line.

The traffic counters 500 are installed on a road (for example, by the roadside of an expressway or a surface street) at certain intervals, measure a vehicle traffic volume, vehicle velocities, or the like in every predetermined section as a traffic state, and transmit it to the traffic data accumulation device 300 as traffic data together with location information (section information). The traffic counter 500 includes, for example, a camera and captures traveling vehicles.

The traffic data accumulation device 300 accumulates the traffic state measured by the traffic counter 500 as traffic data. The accumulated data are managed by the road administrator.

In addition, the abnormal travel detecting system of the present example embodiment employs, as behavior detecting devices that are mounted on a general-purpose vehicle and measure a behavior of the vehicle, a Global Positioning System (GPS) 601 for acquiring location information of a vehicle and an acceleration sensor 602 for acquiring an acceleration rate of the vehicle. It is also assumed that a transmitter 100 is mounted on the vehicle.

The transmitter 100 transmits the location information of the vehicle acquired from the GPS 601 and the acceleration rate of the vehicle acquired from the acceleration sensor 602 to the abnormal travel detecting device 200 as measured values. The transmitter 100 transmits the measured values to the abnormal travel detecting device 200 via the ITS spot 400 installed on the road by, for example, Dedicated Short Range Communications (DSRC).

Figure 2:
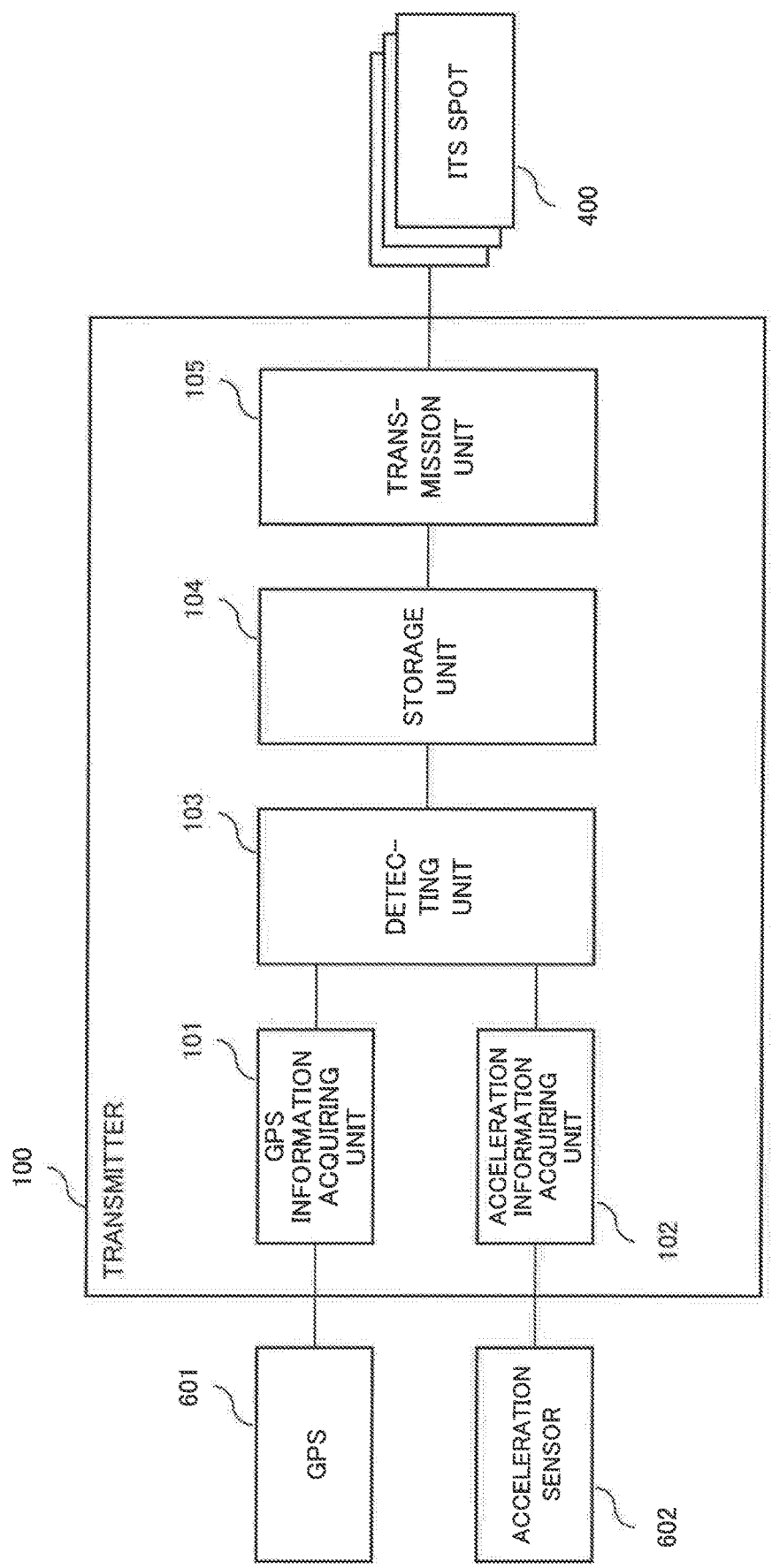
FIG. 2 is a block diagram illustrating a configuration of a transmitter.

FIG. 2 is a block diagram illustrating a configuration of the transmitter 100. As illustrated in FIG. 2, the transmitter 100 includes a GPS information acquiring unit 101, an acceleration information acquiring unit 102, a detecting unit 103, a storage unit 104, and a transmission unit 105. In the present example embodiment, the transmitter 100 is an in-vehicle device that can utilize a mobile phone base station, the ITS spot 400 and the like.

The GPS information acquiring unit 101 acquires the measured value from the GPS 601 mounted on the vehicle as a behavior measuring device.

The acceleration information acquiring unit 102 acquires the measured value from the acceleration sensor 602 mounted on the vehicle as a behavior measuring device.

If it is detected that the measured value acquired by the acceleration information acquiring unit 102 indicates harsh braking or abrupt steering, the detecting unit 103 transmits the detected acceleration rate and location information of the measured values to the storage unit 104. The detecting unit 103 may transmit all the measured values acquired to the storage unit 104.

The storage unit 104 temporarily accumulates the measured values transmitted from the detecting unit 103.

The transmission unit 105 transmits the measured values stored by the storage unit 104 to the abnormal travel detecting device 200.

Figure 3:
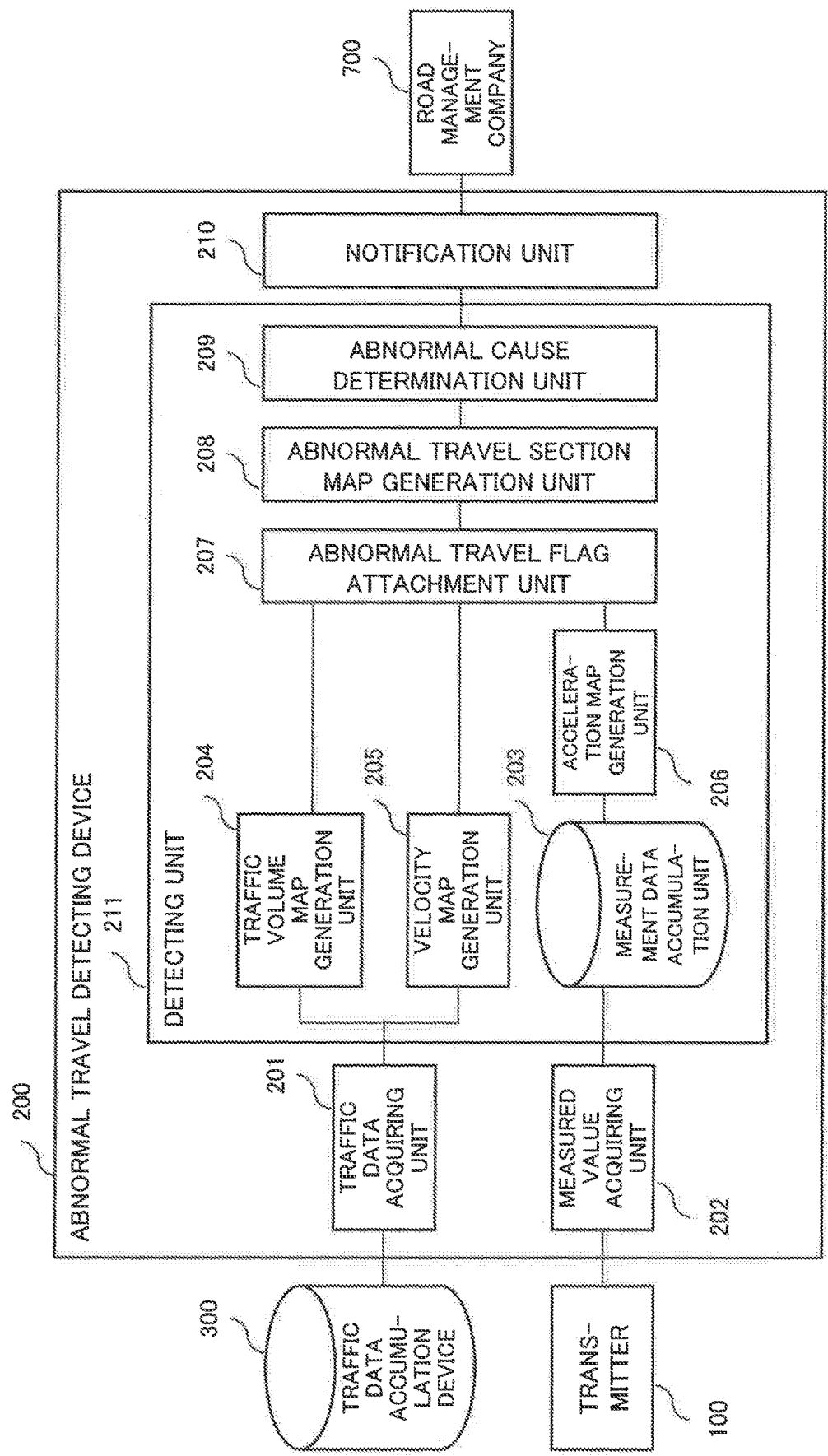
FIG. 3 is a block diagram illustrating a configuration of an abnormal travel detecting device.

FIG. 3 is a block diagram illustrating a configuration of the abnormal travel detecting device 200. The abnormal travel detecting device 200 includes a traffic data acquiring unit 201, a measured value acquiring unit 202, a detecting unit 211, and a notification unit 210. The detecting unit 211 includes a traffic volume map generation unit 204, a velocity map generation unit 205, a measurement data accumulation unit 203, an acceleration map generation unit 206, an abnormal travel flag attachment unit 207, an abnormal travel section map generation unit 208, and an abnormality cause determination unit 209. By including these components, the detecting unit 211 detects abnormal travel of the vehicle, based on the traffic data and the measured values.

The traffic data acquiring unit 201 acquires, from the traffic data accumulation device 300, traffic volume data indicating the vehicle traffic volume in a predetermined section and velocity data indicating vehicle velocities as traffic data.

The measured value acquiring unit 202 acquires, from the transmitter 100, the measured values indicating acceleration rates and location information as measured values indicating a behavior of the vehicle.

The traffic volume map generation unit 204 generates, by utilizing the traffic volume data acquired by the traffic data acquiring unit 201, a traffic volume map indicating a traffic volume per predetermined period in the predetermined section.

The velocity map generation unit 205 generates, by utilizing the velocity data acquired by the traffic data acquiring unit 201, a velocity map indicating vehicle velocities per predetermined period in the predetermined section.

The measurement data accumulation unit 203 accumulates the measured value (acceleration data and location information) indicating the behavior of the vehicle acquired by the measured value acquiring unit 202.

The acceleration map generation unit 206 generates, based on the measured values of acceleration rates accumulated in the measurement data accumulation unit 203, an acceleration map indicating acceleration rates per predetermined period in the predetermined section.

The abnormal travel flag attachment unit 207 attaches abnormal travel flags to the traffic volume map generated by the traffic volume map generation unit 204, the velocity map generated by the velocity map generation unit 205, and the acceleration map generated by the acceleration map generation unit 206.

The abnormal travel section map generation unit 208 generates, by utilizing the maps attached with abnormal travel flags, an abnormal travel section map. Specifically, the abnormal travel section map generation unit 208 generates the abnormal travel section map indicating, as an abnormal travel section, a section where variation of the traffic data (the traffic volume and velocities) per predetermined period in the predetermined section is greater than a first threshold value and variation of the measured values (measured values of the acceleration rates) per predetermined period in the predetermined section is greater than a second threshold value.

The abnormality cause determination unit 209 determines, based on the abnormal travel section map, presence or absence of abnormal travel of the vehicle and a cause thereof. Specifically, the abnormality cause determination unit 209 determines, based on at least one of a length and an area of the section indicated as an abnormal travel section in the abnormal travel section map, presence or absence of abnormal travel of the vehicle and the cause thereof.

The notification unit 210 notifies the road administrator (road management company 700) of an occurrence of abnormal travel and the cause thereof.

Figure 4:
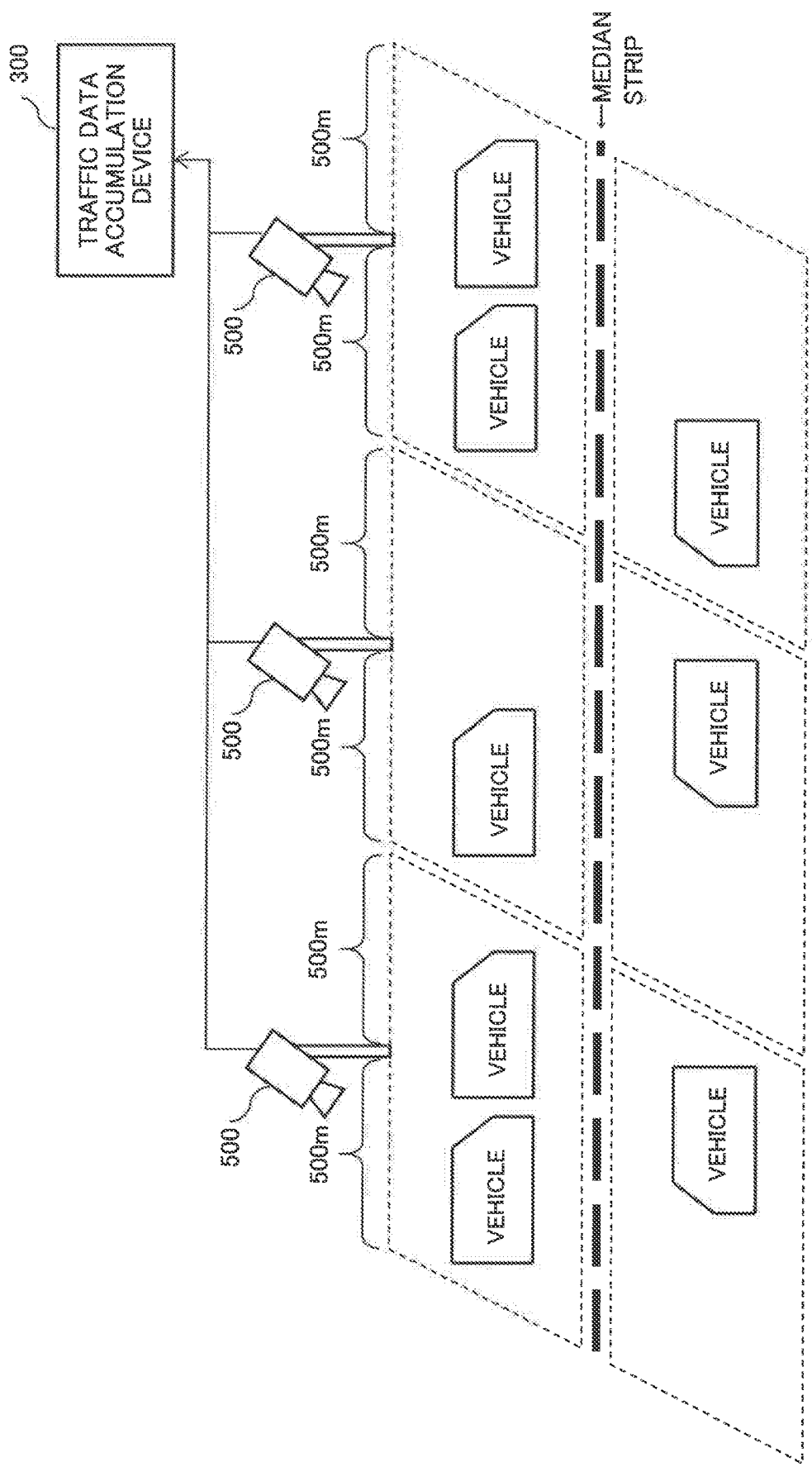
FIG. 4 is an explanatory diagram illustrating a sequence for collecting traffic volume data and velocity data.

FIG. 4 is an explanatory diagram illustrating a sequence for collecting traffic volume data and velocity data. The traffic counters 500 are installed by the roadside of a road at certain intervals, and collect traffic data indicating a traffic state of every predetermined section in a constant period. In the example illustrated in FIG. 4, the predetermined sections are sections enclosed by dashed lines, have a length of 1 km in a direction of travel of a vehicle, and are sectioned into lanes. In the present example embodiment, the traffic counter 500 collects a traffic volume and velocities per minute and transmits traffic volume data and velocity data as traffic data to the traffic data accumulation device 300.

Figure 5:
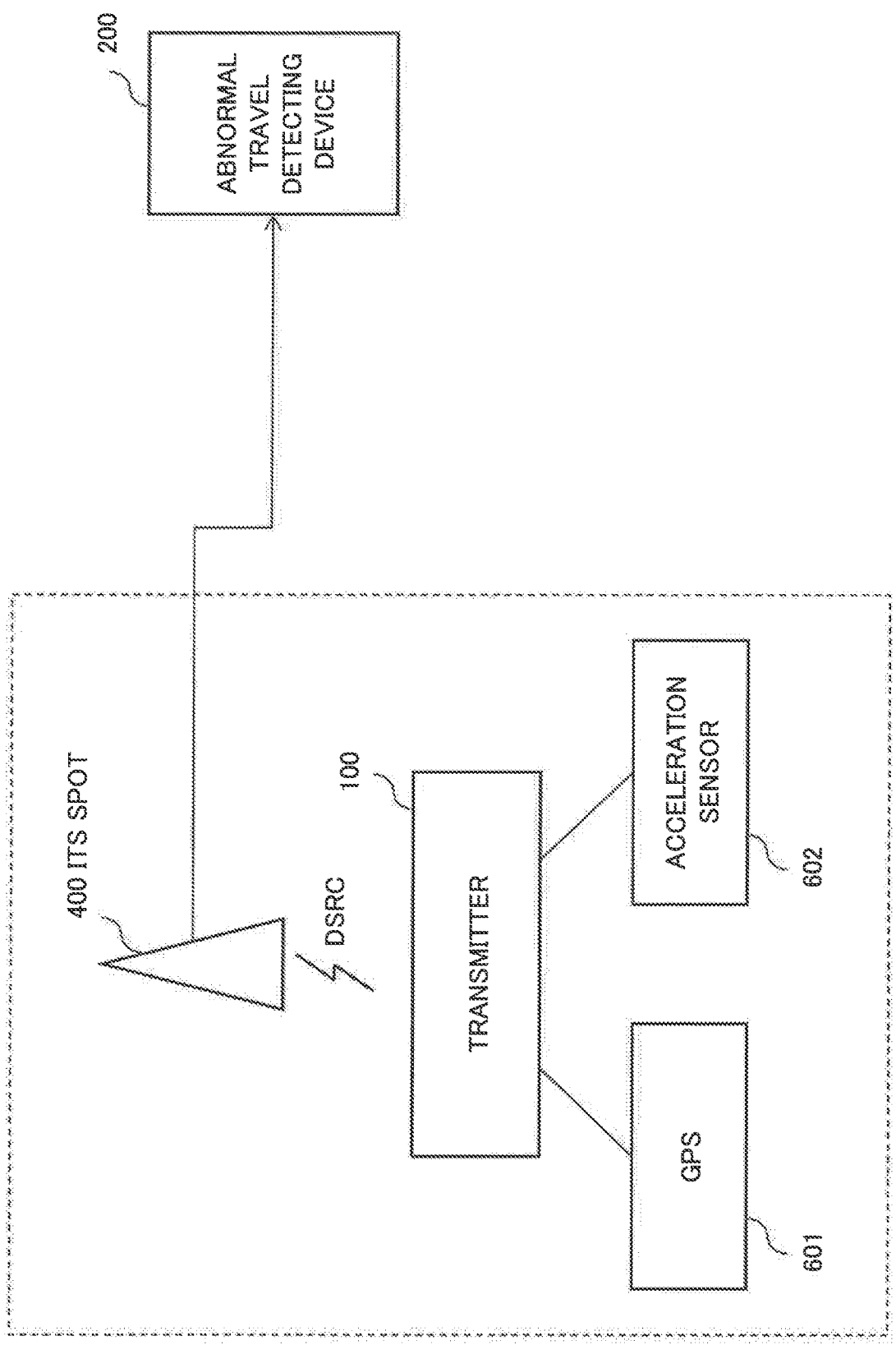
FIG. 5 is an explanatory diagram illustrating an operation of acquiring a measured value indicating a behavior of a vehicle.

FIG. 5 is an explanatory diagram illustrating an operation of acquiring a measured value indicating a behavior of a vehicle. The behavior measuring devices (the GPS 601 and the acceleration sensor 602) and the transmitter 100 configured to transmit the measured values (the acceleration rates and the location information) from the behavior measuring devices to the abnormal travel detecting device 200 are mounted on the vehicle. The transmitter 100 collects the measured values from the GPS 601 and the acceleration sensor 602, and transmits the measured values to the abnormal travel detecting device 200 via the ITS spot 400.

Figure 6:
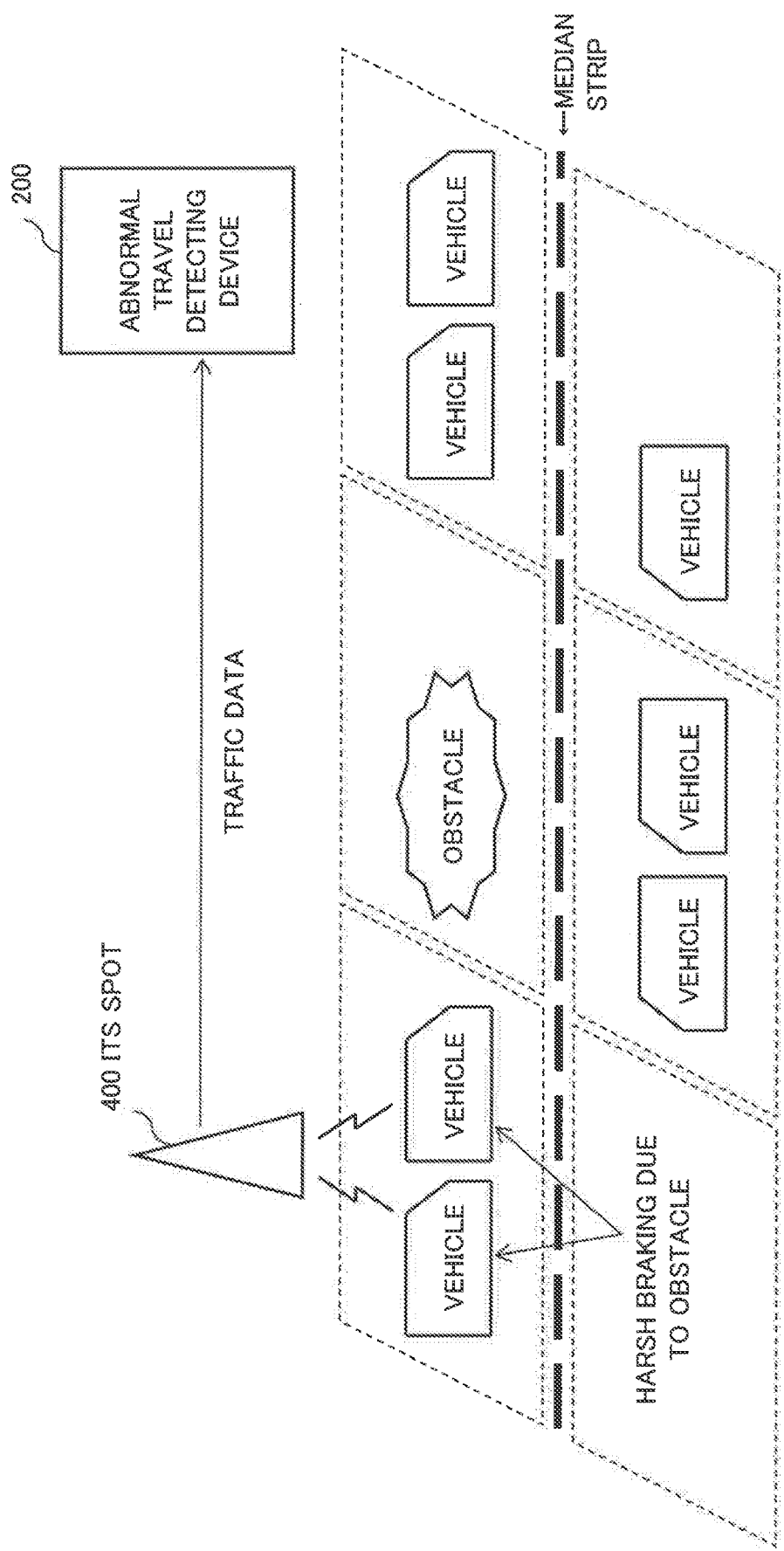
FIG. 6 is an explanatory diagram illustrating an operation of acquiring the measured value indicating the behavior of the vehicle when an impediment occurs.

FIG. 6 is an explanatory diagram illustrating an operation of acquiring measured values indicating the behavior of the vehicle when an impediment occurs. When there is an occurrence of an impediment such as a fallen object from a vehicle or an accident, a vehicle (in the upper left frame of FIG. 6) running on a lane where the impediment occurred performs harsh braking. In this case, the transmitter 100 transmits location information of the vehicle that performed harsh braking to the abnormal travel detecting device 200 via the ITS spot 400.

For example, since there are two vehicles on which harsh braking was measured in the upper left frame of FIG. 6, two sets of acceleration rates and location information are transmitted to the abnormal travel detecting device 200 via the ITS spot 400. When there is no ITS spot 400 near a vehicle, the transmitter 100 may temporarily save the acceleration rates and location information in the storage unit 104 and transmit the acceleration rates and location information at a point in time when communication with the ITS spot 400 is enabled.

The transmitter 100 acquires acceleration data indicating a behavior such as harsh braking or abrupt acceleration and transmits the acceleration data to the abnormal travel detecting device 200 together with location information of the vehicle. For example, when two vehicles each perform harsh braking once in a certain section within a minute, the transmitter 100 transmits location information and acceleration data to the abnormal travel detecting device 200. The abnormal travel detecting device 200 records that the number of abrupt acceleration/deceleration in the section is twice. When a vehicle performs harsh braking and abrupt acceleration once for each in a certain section within a minute, it is also recorded that the number of abrupt acceleration/deceleration in the section is twice.

Figure 7:
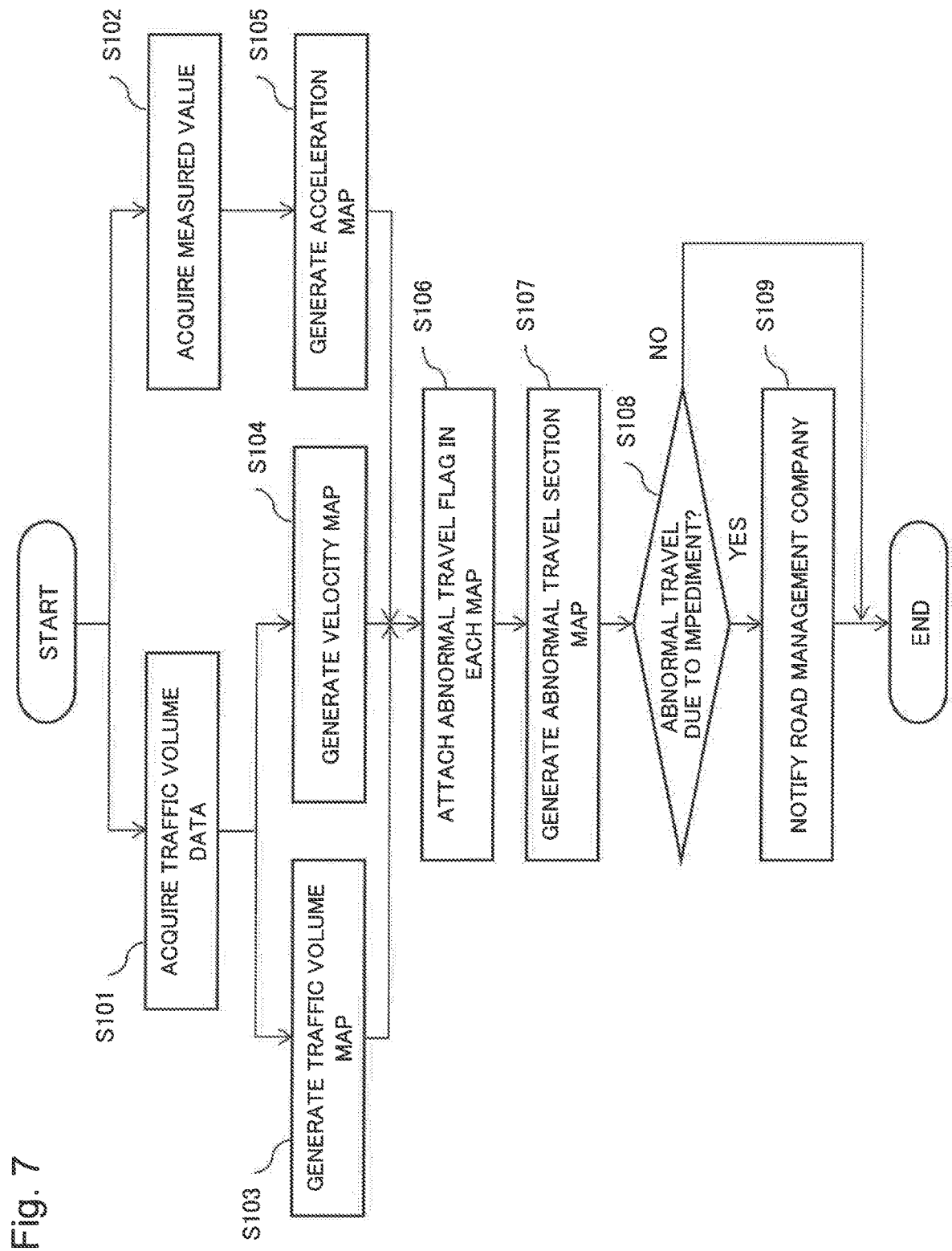
FIG. 7 is a flowchart illustrating operations of an example embodiment of the abnormal travel detecting system.

FIG. 7 is a block diagram illustrating operations of the abnormal travel detecting system. The traffic data acquiring unit 201 acquires, from the traffic data accumulation device 300, the traffic volume data indicating the vehicle traffic volume in every predetermined section and the velocity data indicating the vehicle velocities as traffic data (step S101).

The measured value acquiring unit 202 acquires, from the transmitter 100, the measured value indicating the acceleration rates of the vehicle and the location information of the vehicle as measured values indicating the behavior of the vehicle (step S102).

The traffic volume map generation unit 204 generates, by utilizing the traffic volume data acquired by the traffic data acquiring unit 201, the traffic volume map indicating the traffic volume in every predetermined section (step S103).

The velocity map generation unit 205 generates, by utilizing the velocity data acquired by the traffic data acquiring unit 201, the velocity map indicating the vehicle velocities in every predetermined section (step S104).

The acceleration map generation unit 206 generates the acceleration map, based on the measured values (acceleration data and location information) indicating the behavior of the vehicle accumulated in the measurement data accumulation unit 203 (step S105).

The abnormal travel flag attachment unit 207 acquires the traffic volume map generated by the traffic volume map generation unit 204, the velocity map generated by the velocity map generation unit 205, and the acceleration map generated by the acceleration map generation unit 206. Subsequently, the abnormal travel flag attachment unit 207 attaches an abnormal travel flag to a section, in each map, where abnormal travel is considered to be performed (step S106). Specifically, the abnormal travel flag attachment unit 207 calculates a difference between the most recent map and the map of one minute earlier for each of the traffic volume map, the velocity map, and the acceleration map, then determines, based on the difference, whether abnormality occurs in the section, and attaches an abnormal travel flag.

Next, operations in step S103 to step S106 will be specifically described in FIGS. 9 to 20.

Figure 9:
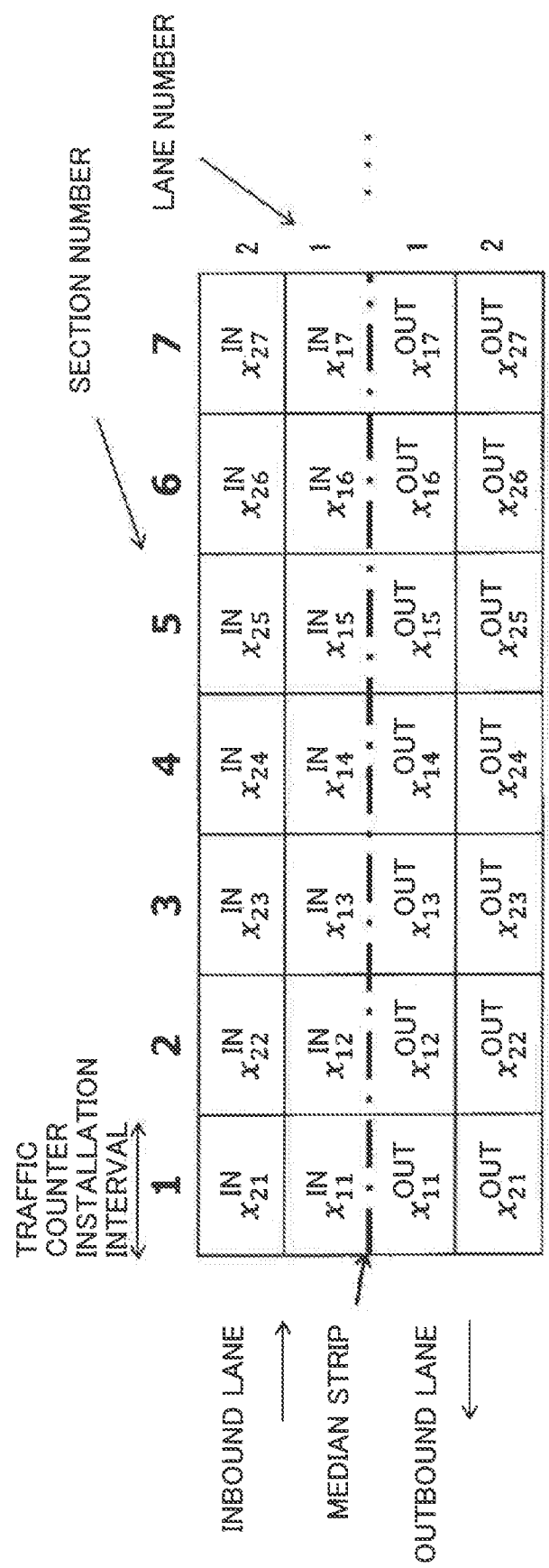
FIG. 9 is an explanatory diagram illustrating a general format of acceleration maps generated by a traffic volume map generation unit.

FIG. 9 is an explanatory diagram illustrating a general format of traffic volume maps generated by the traffic volume map generation unit 204. The traffic volume in every section measured by the traffic counter 500 is indicated at a position of $x_{mn}^l$ on the traffic volume map. In addition, x, l, m, and n are defined as follows:

x: the traffic volume [units/minute]
l: In for an inbound lane, Out for an outbound lane
m: the lane number (1, 2, 3, . . . , m (m is a natural number), allocated in ascending order from the lane on the median strip side to the lane on the roadside)
n: the section number (1, 2, 3, . . . , n (n is a natural number), allocated in ascending order from the section at the origin of the map in the inbound direction)

Figure 10:
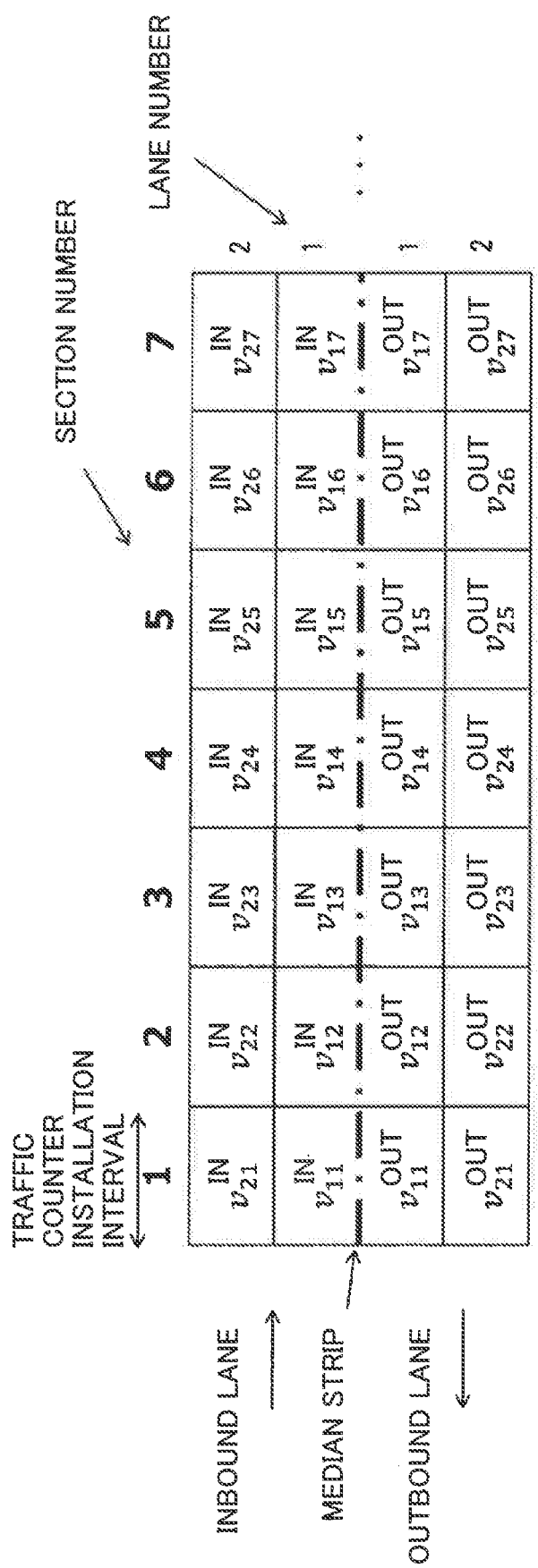
FIG. 10 is an explanatory diagram illustrating a general format of velocity maps generated by a velocity map generation unit.

FIG. 10 is an explanatory diagram illustrating a general format of velocity maps generated by a velocity map generation unit 205. The velocity in every section measured by the traffic counter 500 is indicated at a position of $v_{mn}^l$ on the velocity map.

In addition, v, l, m, and n are represented as follows. The velocity $v_{mn}^l$ is, for example, an average velocity of velocities of all vehicles in a predetermined section.

v: the velocity [km/h]
l: In for an inbound lane, Out for an outbound lane
m: the lane number (1, 2, 3, . . . , m (m is a natural number), allocated in ascending order from the lane on the median strip side to the lane on the roadside)
n: the section number (1, 2, 3, . . . , n (n is a natural number), allocated in ascending order from the section at the origin of the map in the inbound direction)

Figure 11:
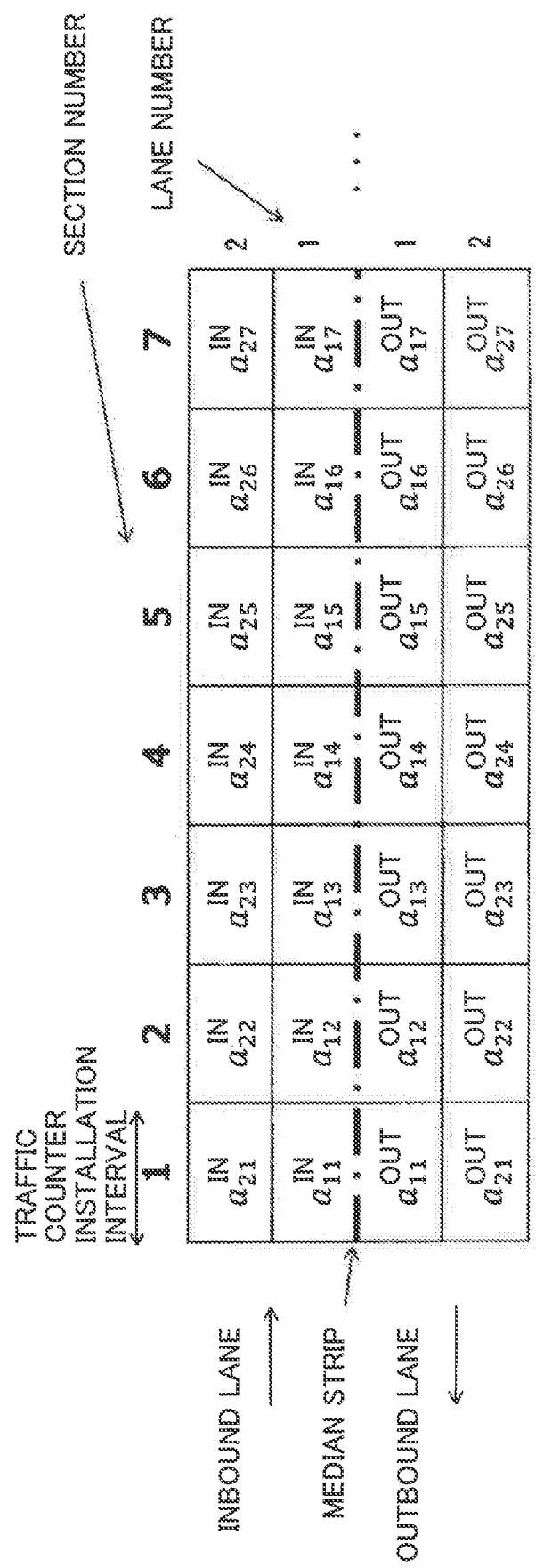
FIG. 11 is an explanatory diagram illustrating a general format of acceleration maps generated by an acceleration map generation unit.

FIG. 11 is an explanatory diagram illustrating a general format of acceleration maps generated by an acceleration map generation unit 206. The acceleration map generation unit 206 counts, based on the acceleration data by the transmitter 100, the numbers of abrupt acceleration and abrupt deceleration in every predetermined section. For example, when the rate of change of the acceleration rates is equal to or greater than a predetermined value, the acceleration map generation unit 206 determines that the acceleration is abrupt acceleration or abrupt deceleration. The number of abrupt acceleration/deceleration in every predetermined section is indicated at a position of $a_{mn}^l$ on the acceleration map. In addition, a, l, m, and n are defined as follows:

a: the number of abrupt acceleration/deceleration [times]
l: In for an inbound lane, Out for an outbound lane
m: the lane number (1, 2, 3, . . . , m (m is a natural number), allocated in ascending order from the lane on the median strip side to the lane on the roadside)
n: the section number (1, 2, 3, . . . , n (n is a natural number), allocated in ascending order from the section at the origin of the map in the inbound direction)

FIG. 12 is an explanatory diagram illustrating an example of traffic volume maps for seven sections having two lanes each way. FIG. 13 is an explanatory diagram illustrating an example of velocity maps for seven sections having two lanes each way. FIG. 14 is an explanatory diagram illustrating an example of acceleration maps for seven sections having two lanes each way.

Figure 15:
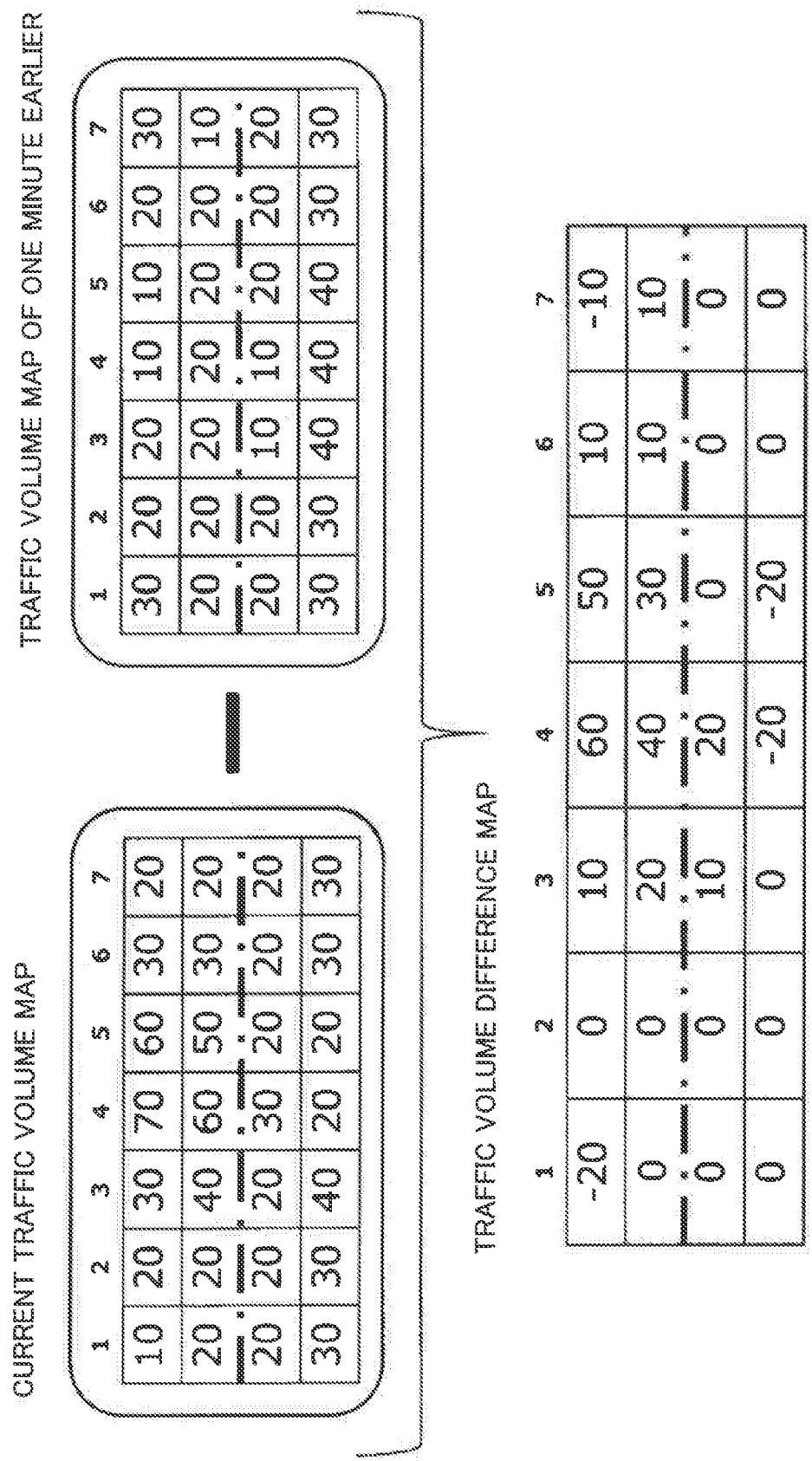
FIG. 15 is an explanatory diagram illustrating an example of traffic volume difference maps.

FIG. 15 is an explanatory diagram illustrating an example of traffic volume difference maps. FIG. 16 is an explanatory diagram illustrating an example of traffic volume difference maps after abnormality flags are attached. The abnormal travel flag attachment unit 207 calculates a difference between the most recent traffic volume map and the traffic volume map of one minute earlier for each section and generates a traffic volume difference map using the difference. The abnormal travel flag attachment unit 207 then determines that the section with a difference greater than a predetermined threshold value to be abnormal and attaches an abnormality flag "1" while attaching "0" by determining that the section with a difference less than the predetermined threshold value to be a normal flow. In the example illustrated in FIG. 16, the abnormal travel flag attachment unit 207 attaches an abnormality flag "1" when the traffic volume in a predetermined period varies (assuming the threshold value to be 0).

Figure 18:
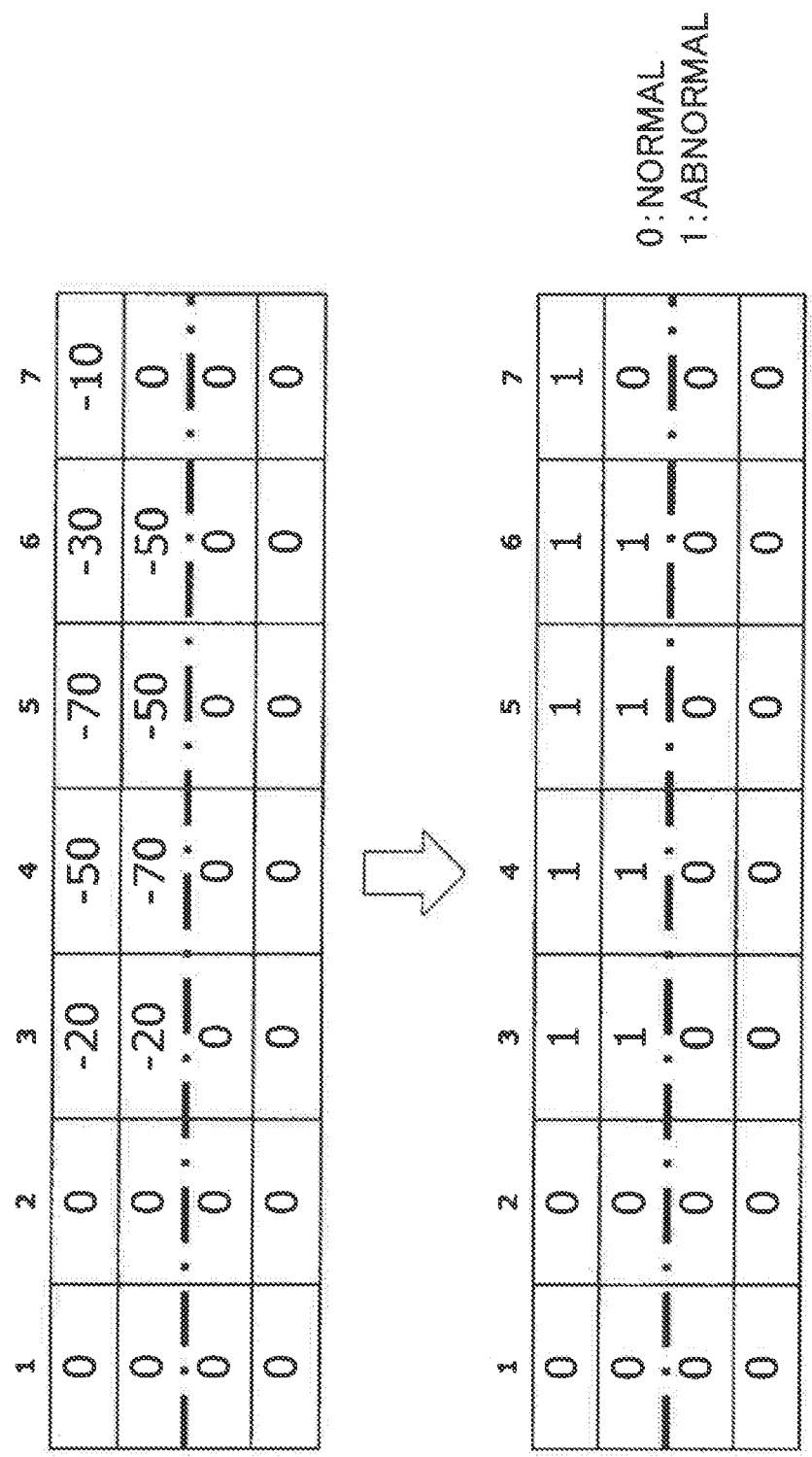
FIG. 18 is an explanatory diagram illustrating an example of velocity difference maps after abnormality flags are attached.

FIG. 17 is an explanatory diagram illustrating an example of velocity difference maps. FIG. 18 is an explanatory diagram illustrating an example of velocity difference maps after abnormality flags are attached. The abnormal travel flag attachment unit 207 acquires a difference between the most recent velocity map and the velocity map of one minute earlier for each section and generates a velocity difference map using the difference. The abnormal travel flag attachment unit 207 then attaches an abnormality flag "1" to the section with a difference greater than a predetermined threshold value being abnormal. The abnormal travel flag attachment unit 207 attaches "0" to the section with a difference less than the predetermined threshold value being a normal flow. In the example illustrated in FIG. 18, the abnormal travel flag attachment unit 207 attaches an abnormality flag "1" when the velocity varies (assuming the threshold value to be 0).

Figure 19:
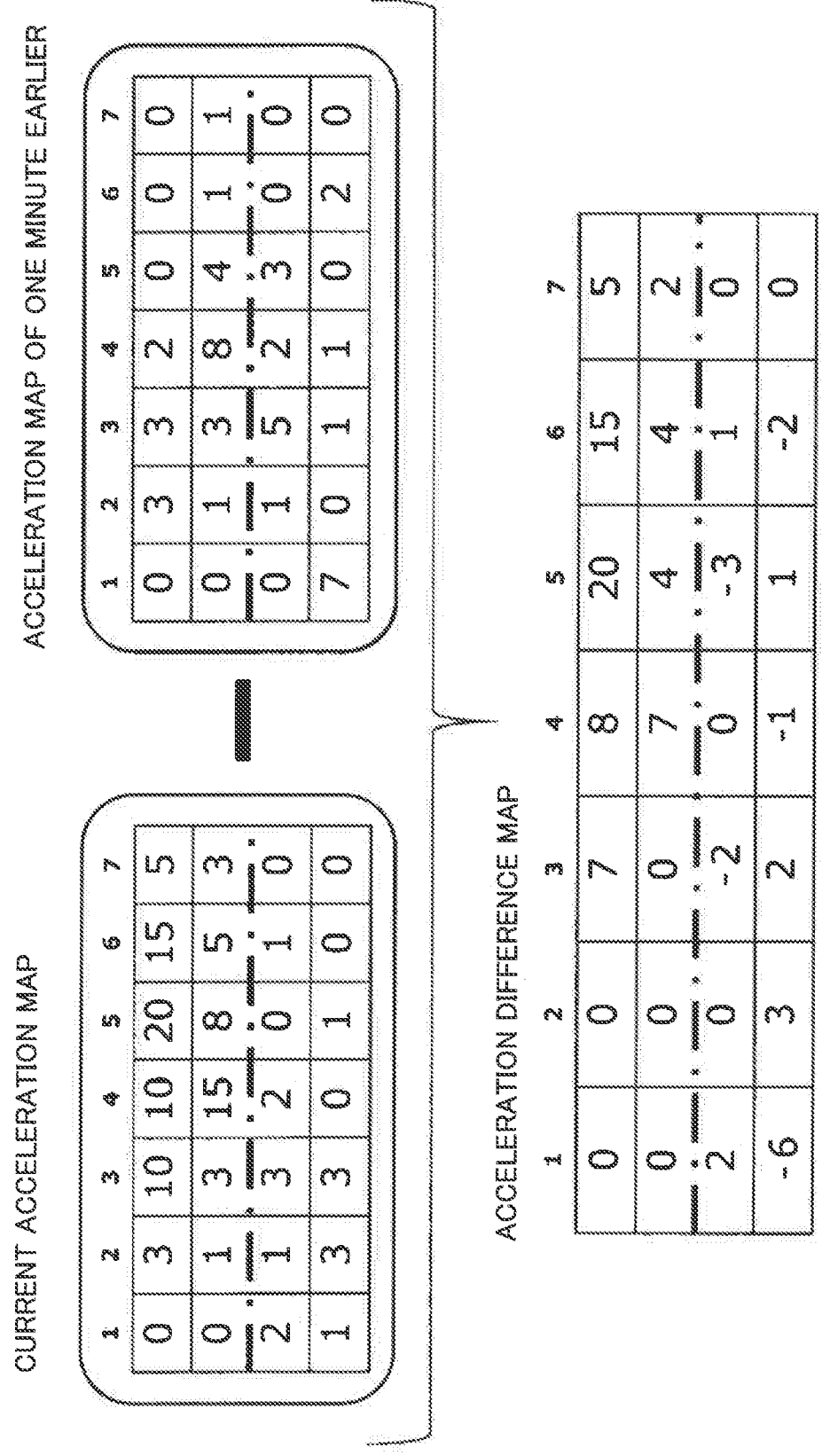
FIG. 19 is an explanatory diagram illustrating an example of acceleration difference maps.
Figure 20:
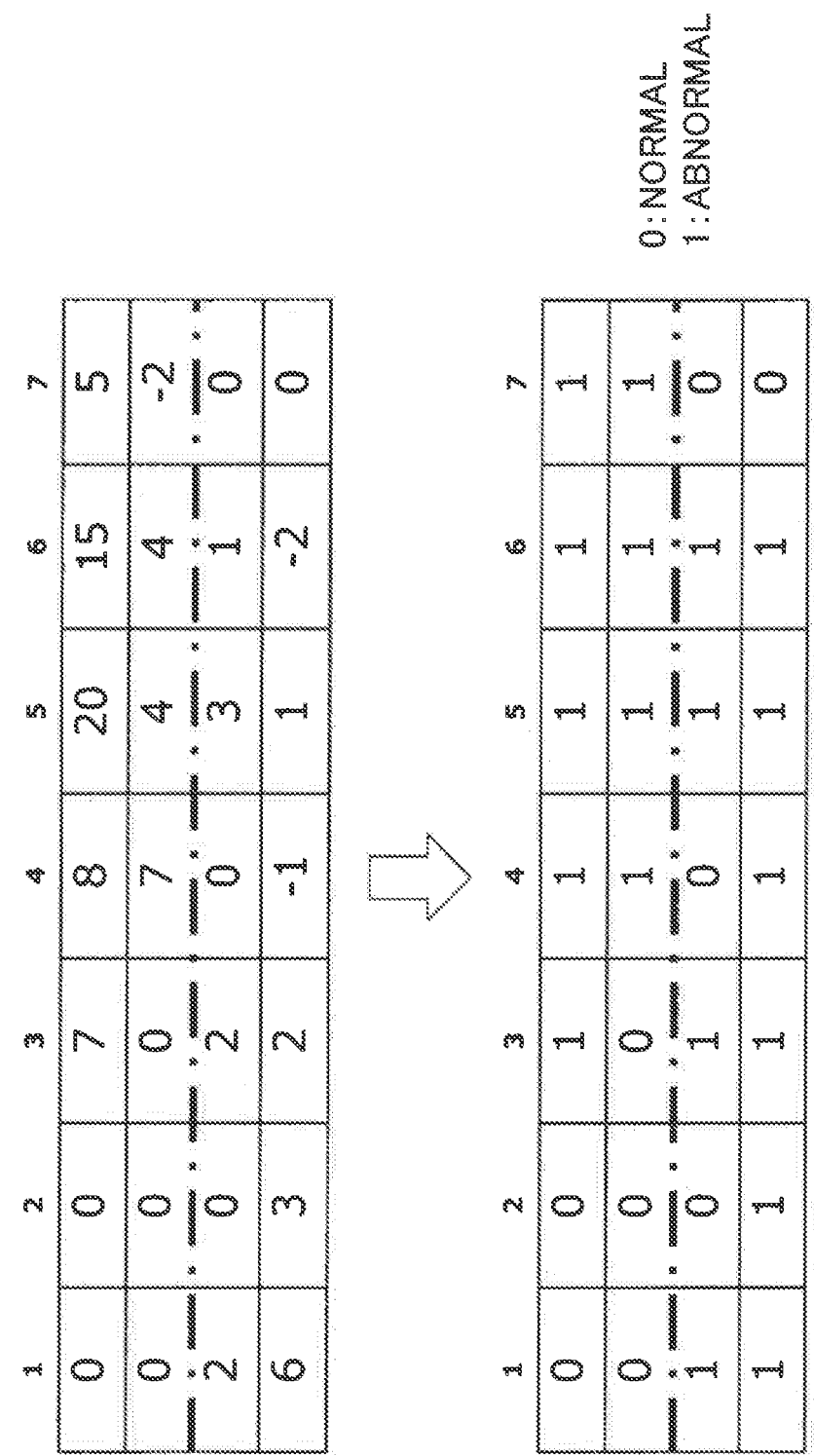
FIG. 20 is an explanatory diagram illustrating an example of acceleration difference maps after abnormality flags are attached.

FIG. 19 is an explanatory diagram illustrating an example of acceleration difference maps. FIG. 20 is an explanatory diagram illustrating an example of acceleration difference maps after abnormality flags are attached. The abnormal travel flag attachment unit 207 acquires a difference between the most recent acceleration map and the acceleration map of one minute earlier for each section and generates an acceleration difference map using the difference. The abnormal travel flag attachment unit 207 then determines that the section with a difference greater than a predetermined threshold value to be abnormal and attaches an abnormality flag "1" while attaching "0" by determining that the section with a difference less than the predetermined threshold value to be a normal flow. In the example illustrated in FIG. 20, the abnormal travel flag attachment unit 207 attaches an abnormality flag "1" when the acceleration rate varies (assuming the threshold value to be 0).

Figure 21:
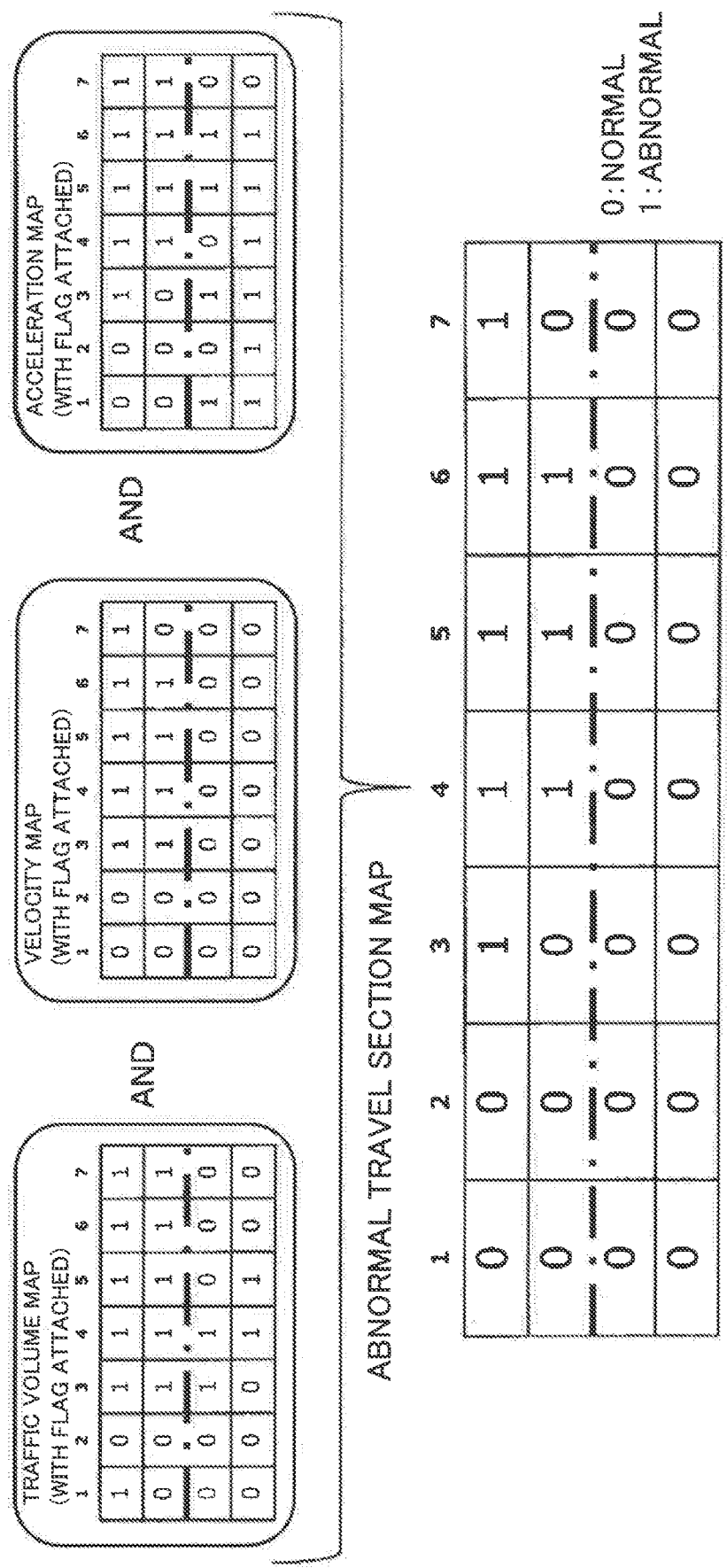
FIG. 21 is an explanatory diagram illustrating an example of abnormal travel section maps.

Next, the abnormal travel section map generation unit 208 generates, by utilizing the maps attached with abnormal travel flags as illustrated in FIG. 16, FIG. 18, and FIG. 20, the abnormal travel section map (step S107). FIG. 21 is an explanatory diagram illustrating an example of abnormal travel section maps. With respect to the traffic data map, the velocity map and the acceleration map with abnormal travel flags attached, the abnormal travel section map generation unit 208 performs AND operations on flags for the same section and generates the abnormal travel section map.

In other words, the abnormal travel section map generation unit 208 attaches "1" to a section with a "1" flag attached in all maps.

Figure 8:
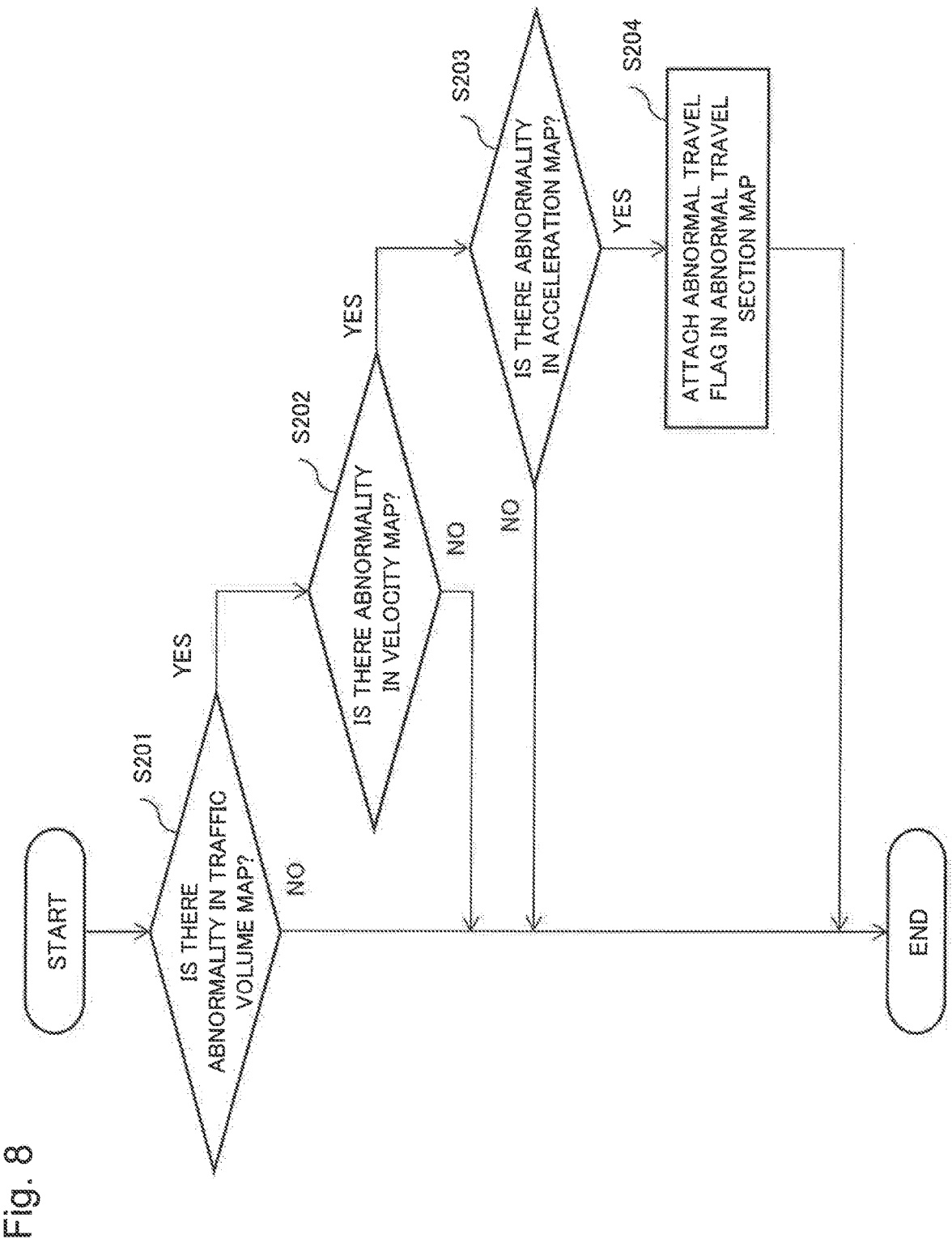
FIG. 8 is a flowchart illustrating a detailed operation of generating an abnormal travel section map.

FIG. 8 is a flowchart illustrating a detailed operation of generating the abnormal travel section map. The abnormal travel section map generation unit 208 determines whether there is abnormality in a single section of a traffic volume map (whether "1" is attached to the section) (step S201). When it is determined that there is abnormality, the abnormal travel section map generation unit 208 determines whether there is abnormality in the same single section of a corresponding velocity map (whether "1" is attached to the section) (step S202). When it is determined that there is abnormality, the abnormal travel section map generation unit 208 determines whether there is abnormality in the same section of a corresponding acceleration map (whether "1" is attached to the section) (step S203). When it is determined that there is abnormality, the abnormal travel section map generation unit 208 attaches "1" to the section (step S204). The abnormal travel section map generation unit 208 generates an abnormal travel section map as illustrated in FIG. 21 by executing a process illustrated in FIG. 8 on all sections.

The abnormality cause determination unit 209 acquires the abnormal travel section map, calculates a length of consecutive abnormal travel sections (sections with "1" attached), and determines a cause of abnormality, based on the length of sections (step S108). The abnormality cause determination unit 209 determines the cause of abnormality, for example, using predefined criteria for determination as follows. The abnormality cause determination unit 209 also determines that there is no abnormal travel in the abnormal travel section map when no abnormal travel section exists.
(1) When a length of the abnormal travel sections is 1-3 km, it is determined that the cause of abnormality is a fallen object or an accident (small-scale);
(2) When a length of the abnormal travel sections is 3-10 km, it is determined that the cause of abnormality is an accident (large-scale) or a natural hazard (dense fog, heavy rain or the like);
(3) When a length of the abnormal travel sections is longer than 10 km, it is determined that the cause of abnormality is a large-scale disaster (collapse of a tunnel, collapse of a road, or the like).

The abnormality cause determination unit 209 determines that the example illustrated in FIG. 21 matches (2) and transmits a determination result to the notification unit 210. In the example illustrated above, the abnormality cause determination unit 209 determines, based on the length of consecutive abnormal travel sections, presence or absence of abnormal travel and the cause of abnormality; however, the abnormality cause determination unit 209 may determine presence or absence of abnormal travel and the cause of abnormality, for example, based on an area of the consecutive abnormal travel sections, or based on both of the length and the area of consecutive abnormal travel sections.

When the determination result transmitted from the abnormality cause determination unit 209 indicates an occurrence of abnormal travel (YES in step S108), the notification unit 210 notifies the road administrator of the determination result (step S109).

Generally speaking, when a behavior such as abrupt steering or harsh braking occurs due to road design such as a road with many sharp curves or a road where lanes are reduced, it depends on vehicles whether abrupt steering or harsh braking is performed, and thus, the acceleration rate may vary. In this case, however, the traffic volume and the velocity will not vary much. In contrast, when an impediment occurs due to an obstacle, an accident or the like, not only the acceleration rate but also the traffic volume and the velocity will vary much. Therefore, the abnormal travel detecting system of the present example embodiment determines that there is an occurrence of abnormal travel (abnormal travel due to an impediment) when variations of not only the acceleration rate but also the traffic volume and the velocity are equal to or greater than predetermined threshold values.

As described above, the abnormal travel detecting system of the present example embodiment utilizes not only measured values that are acquired from the behavior measuring device mounted on the vehicle and indicate the behavior of the vehicle, but also the traffic volume data and the velocity data that are managed and accumulated by the road administrator. Therefore, the abnormal travel detecting system may determine presence or absence of abnormal travel and the cause thereof without being affected by road design such as sharp curves or reduction of a road width.

In addition, the abnormal travel detecting system of the present example embodiment may detect abnormal travel by generating a map utilizing not only the traffic volume data, the velocity data, and the acceleration data but also other data. As data to be used are increased, more maps may be generated, and thus, abnormal travel detection precision may improve. For example, the abnormal travel detecting system may generate a weather conditions map utilizing weather data and generate an abnormal travel section map. In this case, the abnormal travel detecting system may determine whether there is an occurrence of abnormal travel due to change of weather.

Note that the abnormal travel detecting system of the present example embodiment employs the GPS 601 and the acceleration sensor 602 as behavior measuring devices, other sensors may be employed if the sensor may measure a behavior of a vehicle. For example, the behavior measuring device may be a steering angle detection sensor or a braking detection sensor. In this case, the abnormal travel detecting device 200 may generate a steering angle map and a braking map, and in conjunction with a traffic volume map, a velocity map, and an acceleration map, generate an abnormal travel section map.

While the transmitter 100 has a capability of transmitting to the abnormal travel detecting device 200 via the ITS Spot 400, the transmitter 100 may make transmission via a mobile phone base station or a wireless LAN access point. In this case, the transmitter 100 may be a portable information and communication terminal such as a smartphone or a tablet computer. When the portable information and communication terminal includes a sensor (the GPS 601, the acceleration sensor 602, or the like) that may measure a behavior of a vehicle, it is not required to newly mount a behavior measuring device on a vehicle.

While the abnormal travel flag attachment unit 207 generates, based on a difference between the most recent map and the past map of one minute earlier, a difference map in the present example embodiment, the difference map may be generated utilizing a past map, which is not limited to the past map of one minute earlier and may be, for example, a past map of 10 minutes earlier or 30 minutes earlier.

The abnormal travel flag attachment unit 207 may attach an abnormality flag by determining whether the traffic volume, the velocity, and the acceleration rate are different from those under normal conditions by invariant analysis or the like instead of making determination using a threshold value.

The abnormal travel detecting device 200 of the present example embodiment is implemented on a computer. Specifically, the abnormal travel detecting device 200, excluding the measurement data accumulation unit 203, is stored on an auxiliary storage device in the form of a program. The measurement data accumulation unit 203 is stored on the auxiliary storage device as a database. The auxiliary storage device is a non-transitory tangible medium. A CPU (Central Processing Unit) mounted on the computer reads out the program from the auxiliary storage device, load it into the main storage unit, and executes processing in accordance with the program.

Figure 22:
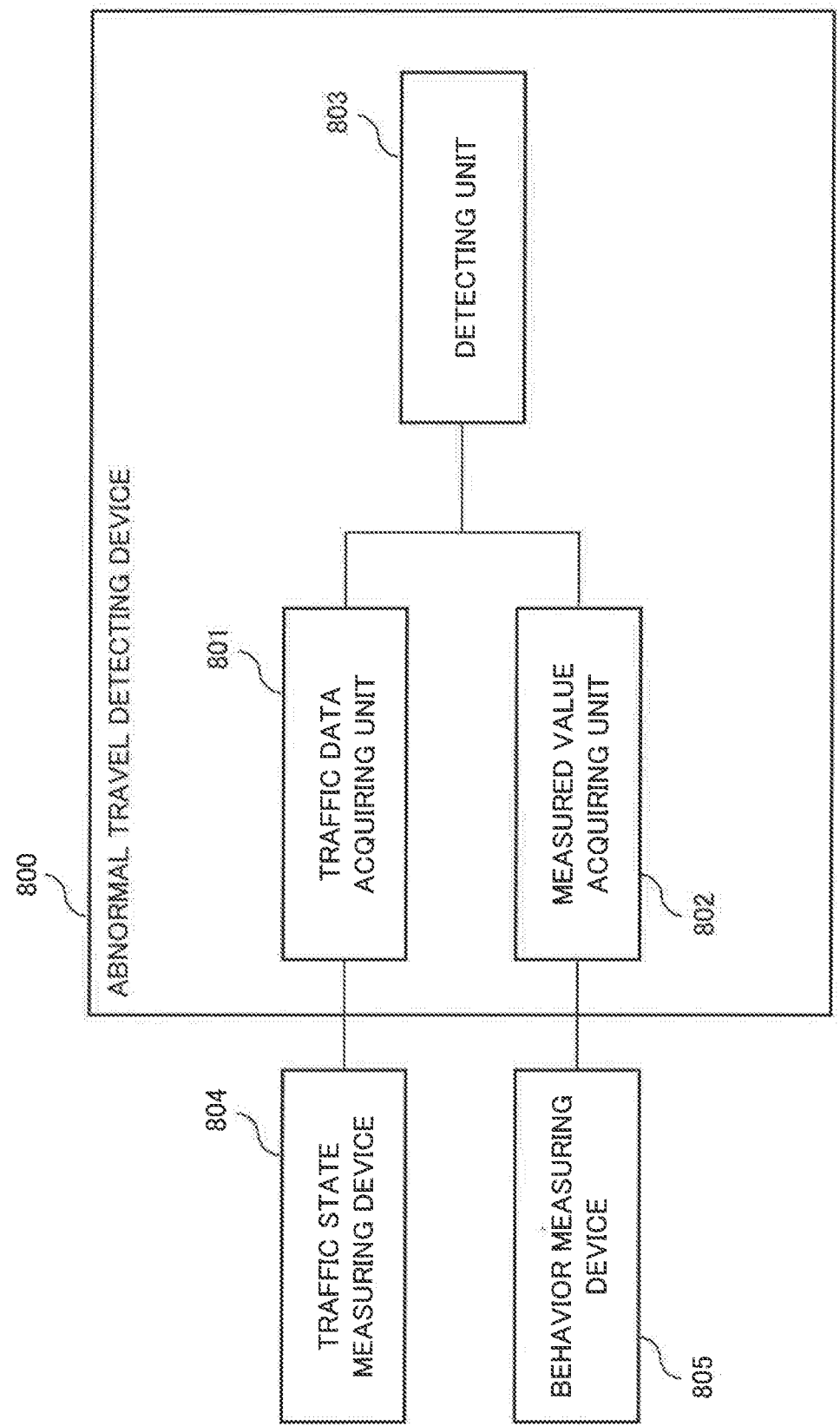
FIG. 22 is a block diagram illustrating a configuration of a main part of the abnormal travel detecting system.

FIG. 22 is a block diagram illustrating a configuration of a main part of the abnormal travel detecting system. The abnormal travel detecting system includes a traffic state measuring device 804 that is installed on the road and measures a traffic state of the road, a behavior measuring device 805 that is mounted on the vehicle and measures the behavior of the vehicle, and an abnormal travel detecting device 800. The abnormal travel detecting device 800 includes a traffic data acquiring unit 801 configured to acquire traffic data indicating the traffic state of the road measured by the traffic state measuring device 804, a measured value acquiring unit 802 configured to acquire measured values indicating the behavior of the vehicle measured by the behavior measuring device 805, and a detecting unit 803 configured to detect, based on the traffic data and the measured values, abnormal travel of the vehicle.

In the example embodiment described above, an abnormal travel detecting system to be described below is also disclosed.

The abnormal travel detecting system including a traffic state measuring device (for example, the traffic counter 500) that is installed on a road and measures a traffic state of the road, a traffic data acquiring unit (for example, the traffic data acquiring unit 201) configured to acquire traffic data indicating the traffic state of the road measured by the traffic state measuring device, a behavior measuring device (for example, the GPS 601 and the acceleration sensor 602) that is mounted on the vehicle and measures a behavior of the vehicle, a measured value acquiring unit (for example, the measured value acquiring unit 202) configured to acquire measured values indicating the behavior of the vehicle measured by the behavior measuring device, and a detecting unit (for example, the detecting unit 211) configured to detect, based on the traffic data and the measured values, abnormal travel of the vehicle.

The abnormal travel detecting system may be configured in such a way that the traffic data include a vehicle traffic volume and vehicle velocities in a predetermined section.

The abnormal travel detecting system may be configured in such a way that the measured values include a measured value of an acceleration rate of the vehicle in a predetermined section.

The abnormal travel detecting system may be configured in such a way that the detecting unit includes an abnormal travel section map generation unit (for example, the abnormal travel section map generation unit 208) that generates an abnormal travel section map indicating, as an abnormal travel section, a section where variation of the traffic data per predetermined period in the predetermined section is greater than a first threshold value and variation of the measured values per predetermined period in the predetermined section is greater than a second threshold value; and an abnormality cause determination unit (for example, the abnormality cause determination unit 209) that determines, based on the abnormal travel section map, presence or absence of abnormal travel of the vehicle. According to such an abnormal travel detecting system, abnormal travel due to an occurrence of an impediment may be easily detected for each section.

The abnormal travel detecting system may be configured to determine the cause of abnormal travel of the vehicle, based on at least one of a length and an area of the section indicated as the abnormal travel section in the abnormal travel section map. According to such an abnormal travel detecting system, the cause of the abnormal travel may be easily determined.

The disclosed subject matter has been described above by exemplifying the aforementioned example embodiment as an exemplary example. However, the disclosed subject matter is not limited to the aforementioned example embodiment. In other words, various aspects that would be understood by those skilled in the art are applicable to the disclosed subject matter within the scope of the disclosed subject matter.

This application claims priority to Japanese Patent Application No. 2016-048656 filed on Mar. 11, 2016, the entire disclosure of which is incorporated herein.

REFERENCE SIGNS LIST

100 transmitter
200 abnormal travel detecting device
201 traffic data acquiring unit
202 measured value acquiring unit
203 measurement data accumulation unit
204 traffic volume map generation unit
205 velocity map generation unit
206 acceleration map generation unit
207 abnormal travel flag attachment unit
208 abnormal travel section map generation unit
209 abnormality cause determination unit
210 notification unit
211 detecting unit
300 traffic data accumulation device
400 ITS spot
500 traffic counter
601 GPS
602 acceleration sensor
700 road management company
800 abnormal travel detecting device
801 traffic data acquiring unit
802 measured value acquiring unit
803 detecting unit
804 traffic state measuring device
805 behavior measuring device

What is claimed is:

1. An abnormal travel detecting device comprising:
at least one memory configured to storage instructions; and
at least one processor configured to execute the instructions to:

acquire traffic data indicating a traffic state of a road measured by a traffic state measuring device that is installed on the road and measures the traffic state of the road;

acquire a measured value indicating a behavior of a vehicle measured by a behavior measuring device that is mounted on the vehicle and measures the behavior of the vehicle;

detect, based on the traffic data and the measured values, abnormal travel of a vehicle; and determine, based on information of the abnormal travel, a scale of a cause of the abnormal travel of a vehicle.

2. The abnormal travel detecting device according to claim 1, wherein
the traffic data includes a vehicle traffic volume and a velocity of the vehicle in a predetermined section.

3. The abnormal travel detecting device according to claim 2, the measured value includes a measured value of an acceleration rate of the vehicle in a predetermined section.

4. The abnormal travel detecting device according to claim 2,
the at least one processor further configured to execute the instructions to:
generate an abnormal travel section map indicating, as an abnormal travel section, a section where variation of the traffic data per predetermined period in the predetermined section is greater than a first threshold value and variation of the measured values per predetermined period in the predetermined section is greater than a second threshold value; and
determine, based on the abnormal travel section map, presence or absence of abnormal travel of the vehicle.

5. The abnormal travel detecting device according to claim 1, wherein
the measured value includes a measured value of an acceleration rate of the vehicle in a predetermined section.

6. The abnormal travel detecting device according to claim 5,
the at least one processor further configured to execute the instructions to:
generate an abnormal travel section map indicating, as an abnormal travel section, a section where variation of the traffic data per predetermined period in the predetermined section is greater than a first threshold value and variation of the measured values per predetermined period in the predetermined section is greater than a second threshold value; and
determine, based on the abnormal travel section map, presence or absence of abnormal travel of the vehicle.

7. The abnormal travel detecting device according to claim 1,
the at least one processor further configured to execute the instructions to:
generate an abnormal travel section map indicating, as an abnormal travel section, a section where variation of the traffic data per predetermined period in the predetermined section is greater than a first threshold value and variation of the measured values per predetermined period in the predetermined section is greater than a second threshold value; and
determine, based on the abnormal travel section map, presence or absence of abnormal travel of the vehicle.

8. The abnormal travel detecting device according to claim 7,
the at least one processor further configured to execute the instructions to:

determine a cause of abnormal travel of the vehicle, based on at least one of a length and an area of the section indicated as the abnormal travel section in the abnormal travel section map.

9. An abnormal travel detecting system, comprising:
the abnormal travel detecting system according to claim 1;
a traffic state measuring device that is installed on a road and measures a traffic state of the road;
a behavior measuring device that is mounted on a vehicle and measures a behavior of the vehicle; and
determine, based on information of the abnormal travel, a scale of a cause of the abnormal travel of a vehicle.

10. The abnormal travel detecting system, according to claim 9, the behavior measuring device acquires location information of the vehicle as measure with a Global Positioning System and acquires an acceleration rate of the vehicle with an acceleration sensor.

11. The abnormal travel detecting device according to claim 1,
the traffic data includes a vehicle traffic volume and a velocity of the vehicle in a predetermined section,
the measured value includes a measured value of an acceleration rate of the vehicle in the predetermined section, and
the at least one processor further configured to execute the instructions to:
generate, by utilizing the traffic volume data, a traffic volume map indicating a traffic volume per predetermined period in the predetermined section,
generate, by utilizing the velocity data, a velocity map indicating vehicle velocities per predetermined period in the predetermined section,
generate, based on the measured values of acceleration rates, an acceleration map indicating acceleration rates per predetermined period in the predetermined section,
detect, based on the traffic volume map, the velocity map and the acceleration map, abnormal travel of a vehicle.

12. The abnormal travel detecting device according to claim 11,
the at least one processor further configured to execute the instructions to:
calculate a difference between a most recent traffic volume map and a past traffic volume map,
determine that the predetermined section in which the difference calculated of the traffic volume map is greater than the predetermined threshold value to be abnormal,
calculate a difference between a most recent velocity map and a past velocity map,
determine that the predetermined section in which the difference calculated of the velocity map is greater than the predetermined threshold value to be abnormal,
calculate a difference between a most recent acceleration map and a past acceleration map,
determine that the predetermined section in which the difference calculated of the acceleration map is greater than the predetermined threshold value to be abnormal,
generate an abnormal travel section map in which an abnormality flag is added to the predetermined section determined to be abnormal in all of the traffic volume map, the velocity map and the acceleration map, detect, based on the abnormal travel section map, abnormal travel of the vehicle.

13. The abnormal travel detecting device according to claim 1, wherein
the at least one processor is further configured to execute the instructions to
determine, based on the scale, the cause from among a fallen object or a small-scale accident, a large-scale accident or a natural hazard, and a large-scale disaster.

14. An abnormal travel detecting method, comprising:
acquiring traffic data indicating a traffic state of a road from a traffic state measuring device that is installed on the road and measures the traffic state of the road;
acquiring measured values indicating a behavior of a vehicle measured by a behavior measuring device that is mounted on the vehicle and measures the behavior of the vehicle;
detecting, based on the traffic data and the measured values, abnormal travel of the vehicle; and
determine, based on information of the abnormal travel, a scale of a cause of the abnormal travel of a vehicle.

15. A non-transitory computer readable storage medium storing an abnormal travel detection program causing a computer to execute:
traffic data acquisition process of acquiring traffic data indicating a traffic state of a road measured by a traffic state measuring device that is installed on the road and measures the traffic state of the road;
measured value acquisition process of acquiring measured values indicating a behavior of the vehicle measured by a behavior measuring device that is mounted on the vehicle and measures the behavior of the vehicle;
detection process of detecting, based on the traffic data and the measured values, abnormal travel of the vehicle; and
determine, based on information of the abnormal travel, a scale of a cause of the abnormal travel of a vehicle.

* * * * *